US009848161B2

(12) United States Patent
Krakirian et al.

(10) Patent No.: US 9,848,161 B2
(45) Date of Patent: Dec. 19, 2017

(54) VIDEO RECORDER HAVING USER EXTENDED AND AUTOMATICALLY EXTENDED TIME SLOTS

(75) Inventors: Haig H. Krakirian, Burbank, CA (US); James A. Bumgardner, Shadow Hills, CA (US); Daniel Thomas Ward, Los Angeles, CA (US); Geoffrey Z. Ombao, Pacific Palisades, CA (US)

(73) Assignee: Rovi Guides, Inc., San Carlos, CA (US)

( * ) Notice: Subject to any disclaimer, the term of this patent is extended or adjusted under 35 U.S.C. 154(b) by 320 days.

(21) Appl. No.: 13/438,237

(22) Filed: Apr. 3, 2012

(65) Prior Publication Data

US 2012/0189269 A1 Jul. 26, 2012

Related U.S. Application Data

(63) Continuation of application No. 12/626,267, filed on Nov. 25, 2009, now Pat. No. 8,176,516, which is a (Continued)

(51) Int. Cl.
*H04N 5/76* (2006.01)
*H04N 5/782* (2006.01)
(Continued)

(52) U.S. Cl.
CPC .............. *H04N 5/782* (2013.01); *H04N 5/765* (2013.01); *H04N 5/775* (2013.01); *H04N 5/781* (2013.01)

(58) Field of Classification Search
CPC ......... H04N 21/4332; H04N 21/47214; H04N 21/23109; H04N 21/4755
(Continued)

(56) References Cited

U.S. PATENT DOCUMENTS 3,594,778 A    7/1971   Herald et al.
3,848,193 A    11/1974   Martin et al.
(Continued)

FOREIGN PATENT DOCUMENTS

DE    2918846    11/1980
DE    3337204    4/1985
(Continued)

OTHER PUBLICATIONS

"DIRECTV Digital Satellite Receiver—Operating Instructions," Sony Electronics Inc. (2001).
(Continued)

*Primary Examiner* — Helen Shibru
(74) *Attorney, Agent, or Firm* — Haley Guiliano LLP

(57) ABSTRACT

The present invention is directed to a video recorder having user extended and automatically extended time slots. An embodiment of the present invention includes a set-top box having an internal storage device, such as a hard drive where broadcasts are transferred from a broadcast input source to the storage device. The set-top box is connected to an output device such as a television, which displays a graphical user interface (GUI) and an interactive program guide (IPG). The user has the option to extend a chosen time slot, in which a show is scheduled to be transferred to the storage device. A dialog box is used when certain types of shows are selected that commonly require timeslot extensions at the end of the show.

20 Claims, 21 Drawing Sheets

Related U.S. Application Data continuation of application No. 10/936,417, filed on Sep. 8, 2004, now abandoned, which is a continuation-in-part of application No. 10/707,834, filed on Jan. 15, 2004, now Pat. No. 7,853,120, which is a continuation of application No. 10/249,575, filed on Apr. 21, 2003, now Pat. No. 6,760,538.

(51) Int. Cl.
    *H04N 5/765* (2006.01)
    *H04N 5/775* (2006.01)
    *H04N 5/781* (2006.01)

(58) Field of Classification Search
    USPC .................................. 386/291–293, 296–297
    See application file for complete search history.

(56) References Cited

U.S. PATENT DOCUMENTS

| | | |
|---|---|---|
| 3,893,049 A | 7/1975 | Bray |
| 4,162,513 A | 7/1979 | Beyers et al. |
| 4,224,644 A | 9/1980 | Lewis et al. |
| 4,264,924 A | 4/1981 | Freeman |
| 4,264,925 A | 4/1981 | Freeman et al. |
| 4,288,809 A | 9/1981 | Yabe |
| 4,325,081 A | 4/1982 | Abe et al. |
| 4,338,644 A | 7/1982 | Staar |
| 4,339,798 A | 7/1982 | Hedges et al. |
| 4,355,415 A | 10/1982 | George et al. |
| 4,422,105 A | 12/1983 | Rodesch et al. |
| 4,425,579 A | 1/1984 | Merrell |
| 4,429,385 A | 1/1984 | Cichelli et al. |
| 4,437,498 A | 3/1984 | Pankratz et al. |
| 4,488,179 A | 12/1984 | Krüger et al. |
| 4,495,654 A | 1/1985 | Deiss |
| 4,496,171 A | 1/1985 | Cherry |
| 4,573,072 A | 2/1986 | Freeman |
| 4,602,279 A | 7/1986 | Freeman |
| 4,620,229 A | 10/1986 | Amano et al. |
| 4,641,205 A | 2/1987 | Beyers, Jr. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,718,107 A | 1/1988 | Hayes |
| 4,739,406 A | 4/1988 | Morton et al. |
| 4,745,549 A | 5/1988 | Hashimoto |
| 4,751,578 A | 6/1988 | Reiter et al. |
| 4,787,063 A | 11/1988 | Muguet |
| 4,789,962 A | 12/1988 | Berry et al. |
| 4,807,052 A | 2/1989 | Amano |
| 4,812,940 A | 3/1989 | Takenaga |
| 4,847,696 A | 7/1989 | Matsumoto et al. |
| 4,847,698 A | 7/1989 | Freeman |
| 4,847,700 A | 7/1989 | Freeman |
| 4,855,833 A | 8/1989 | Kageyama et al. |
| 4,857,999 A | 8/1989 | Welsh |
| 4,873,584 A | 10/1989 | Hashimoto |
| 4,879,611 A | 11/1989 | Fukiu et al. |
| 4,885,775 A | 12/1989 | Lucas |
| 4,894,789 A | 1/1990 | Yee |
| 4,908,707 A | 3/1990 | Kinghorn |
| 4,908,713 A | 3/1990 | Levine |
| 4,930,158 A | 5/1990 | Vogel |
| 4,945,563 A | 7/1990 | Horton et al. |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 4,989,104 A | 1/1991 | Schulein et al. |
| 5,027,400 A | 6/1991 | Baji et al. |
| 5,038,211 A | 8/1991 | Hallenbeck |
| 5,047,867 A | 9/1991 | Strubbe et al. |
| 5,068,733 A | 11/1991 | Bennett |
| 5,109,279 A | 4/1992 | Ando |
| 5,109,414 A | 4/1992 | Harvey et al. |
| 5,134,719 A | 7/1992 | Mankovitz |
| 5,151,789 A | 9/1992 | Young |
| 5,155,591 A | 10/1992 | Wachob |
| 5,172,111 A | 12/1992 | Olivo |
| 5,172,413 A | 12/1992 | Bradley et al. |
| 5,187,589 A | 2/1993 | Kono et al. |
| 5,195,134 A | 3/1993 | Inoue |
| 5,200,822 A | 4/1993 | Bronfin et al. |
| 5,210,611 A | 5/1993 | Yee et al. |
| 5,223,924 A | 6/1993 | Strubbe |
| 5,231,493 A | 7/1993 | Apitz |
| RE34,340 E | 8/1993 | Freeman |
| 5,233,654 A | 8/1993 | Harvey et al. |
| 5,241,428 A | 8/1993 | Goldwasser et al. |
| 5,249,043 A | 9/1993 | Grandmougin |
| 5,253,066 A | 10/1993 | Vogel |
| 5,285,284 A | 2/1994 | Takashima et al. |
| 5,293,357 A | 3/1994 | Hallenbeck |
| 5,296,931 A | 3/1994 | Na |
| 5,299,006 A | 3/1994 | Kim |
| 5,323,234 A | 6/1994 | Kawasaki |
| 5,335,277 A | 8/1994 | Harvey et al. |
| 5,339,434 A | 8/1994 | Rusis |
| 5,341,350 A | 8/1994 | Frank et al. |
| 5,353,121 A | 10/1994 | Young et al. |
| 5,357,276 A | 10/1994 | Banker et al. |
| 5,371,551 A | 12/1994 | Logan et al. |
| 5,404,567 A | 4/1995 | DePietro et al. |
| 5,410,344 A | 4/1995 | Graves et al. |
| 5,412,720 A | 5/1995 | Hoarty |
| 5,416,508 A | 5/1995 | Sakuma et al. |
| 5,426,699 A | 6/1995 | Wunderlich et al. |
| 5,442,389 A | 8/1995 | Blahut et al. |
| 5,459,522 A | 10/1995 | Pint |
| 5,461,415 A | 10/1995 | Wolf et al. |
| 5,465,385 A | 11/1995 | Ohga et al. |
| 5,479,266 A | 12/1995 | Young et al. |
| 5,479,268 A | 12/1995 | Young et al. |
| 5,483,278 A | 1/1996 | Strubbe et al. |
| 5,485,197 A | 1/1996 | Hoarty |
| 5,485,219 A | 1/1996 | Woo |
| 5,502,504 A | 3/1996 | Marshall et al. |
| 5,508,815 A | 4/1996 | Levine |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,524,271 A | 6/1996 | Hollmann et al. |
| 5,528,304 A | 6/1996 | Cherrick et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,539,880 A | 7/1996 | Lakhani |
| 5,541,638 A | 7/1996 | Story |
| 5,541,738 A | 7/1996 | Mankovitz |
| 5,548,338 A | 8/1996 | Ellis et al. |
| 5,550,576 A | 8/1996 | Klosterman |
| 5,550,825 A | 8/1996 | McMullan, Jr. et al. |
| 5,557,338 A | 9/1996 | Maze et al. |
| 5,559,548 A | 9/1996 | Davis et al. |
| 5,559,549 A | 9/1996 | Hendricks et al. |
| 5,568,272 A | 10/1996 | Levine |
| 5,574,778 A | 11/1996 | Ely et al. |
| 5,576,755 A | 11/1996 | Davis et al. |
| 5,583,560 A | 12/1996 | Florin et al. |
| 5,583,561 A | 12/1996 | Baker et al. |
| 5,583,563 A | 12/1996 | Wanderscheid et al. |
| 5,583,653 A | 12/1996 | Timmermans |
| 5,585,838 A | 12/1996 | Lawler et al. |
| 5,585,858 A | 12/1996 | Harper et al. |
| 5,589,892 A | 12/1996 | Knee et al. |
| 5,592,551 A | 1/1997 | Lett et al. |
| 5,594,509 A | 1/1997 | Florin |
| 5,594,779 A | 1/1997 | Goodman |

(56) References Cited

U.S. PATENT DOCUMENTS

| | | |
|---|---|---|
| 5,600,364 A | 2/1997 | Hendricks et al. |
| 5,602,582 A | 2/1997 | Wanderscheid et al. |
| 5,606,642 A | 2/1997 | Stautner et al. |
| 5,616,876 A | 4/1997 | Cluts |
| 5,619,247 A | 4/1997 | Russo |
| 5,619,249 A | 4/1997 | Billock et al. |
| 5,619,274 A | 4/1997 | Roop et al. |
| 5,623,613 A | 4/1997 | Rowe et al. |
| 5,625,678 A | 4/1997 | Blomfield-Brown |
| 5,629,733 A | 5/1997 | Youman et al. |
| 5,629,867 A | 5/1997 | Goldman |
| 5,630,119 A | 5/1997 | Aristides et al. |
| 5,631,995 A | 5/1997 | Weissensteiner et al. |
| 5,632,007 A | 5/1997 | Freeman |
| 5,635,978 A | 6/1997 | Alten |
| 5,635,987 A | 6/1997 | Park et al. |
| 5,648,824 A | 7/1997 | Dunn et al. |
| 5,652,613 A | 7/1997 | Lazarus et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,414 A | 8/1997 | Lett et al. |
| 5,659,367 A | 8/1997 | Yuen |
| 5,661,526 A | 8/1997 | Hamamoto et al. |
| 5,666,645 A | 9/1997 | Thomas et al. |
| 5,668,917 A | 9/1997 | Lewine |
| 5,675,743 A | 10/1997 | Mavity |
| 5,684,525 A | 11/1997 | Klosterman |
| 5,694,163 A | 12/1997 | Harrison |
| 5,694,381 A | 12/1997 | Sako |
| 5,696,765 A | 12/1997 | Safadi |
| 5,699,107 A | 12/1997 | Lawler et al. |
| 5,708,961 A | 1/1998 | Hylton et al. |
| 5,710,601 A | 1/1998 | Marshall et al. |
| 5,717,452 A | 2/1998 | Janin et al. |
| 5,721,829 A | 2/1998 | Dunn et al. |
| 5,724,091 A | 3/1998 | Freeman et al. |
| 5,727,060 A | 3/1998 | Young |
| 5,732,216 A | 3/1998 | Logon et al. |
| 5,734,119 A | 3/1998 | France et al. |
| 5,734,719 A | 3/1998 | Tsevdos et al. |
| 5,742,443 A | 4/1998 | Tsao et al. |
| 5,745,710 A | 4/1998 | Clanton, III et al. |
| 5,751,282 A | 5/1998 | Girard et al. |
| 5,752,159 A | 5/1998 | Faust et al. |
| 5,752,160 A | 5/1998 | Dunn |
| 5,754,771 A | 5/1998 | Epperson et al. |
| 5,758,257 A | 5/1998 | Herz et al. |
| 5,758,258 A | 5/1998 | Shoff et al. |
| 5,758,259 A | 5/1998 | Lawler |
| 5,760,821 A | 6/1998 | Ellis et al. |
| 5,768,528 A | 6/1998 | Stumm |
| 5,771,435 A | 6/1998 | Brown |
| 5,774,170 A | 6/1998 | Hite et al. |
| 5,778,182 A | 7/1998 | Cathey et al. |
| 5,778,187 A | 7/1998 | Monteiro et al. |
| 5,781,226 A | 7/1998 | Sheehan |
| 5,781,227 A | 7/1998 | Goode et al. |
| 5,790,198 A | 8/1998 | Roop et al. |
| 5,790,202 A | 8/1998 | Kummer et al. |
| 5,790,423 A | 8/1998 | Lau et al. |
| 5,793,412 A | 8/1998 | Asamizuya |
| 5,793,971 A | 8/1998 | Fujita et al. |
| 5,794,217 A | 8/1998 | Allen |
| 5,796,952 A | 8/1998 | Davis et al. |
| 5,801,787 A | 9/1998 | Schein et al. |
| 5,802,284 A | 9/1998 | Karlton et al. |
| 5,805,154 A | 9/1998 | Brown |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,808,694 A | 9/1998 | Usui et al. |
| 5,809,204 A | 9/1998 | Young et al. |
| 5,809,246 A | 9/1998 | Goldman |
| 5,812,123 A | 9/1998 | Rowe et al. |
| 5,812,205 A | 9/1998 | Milnes et al. |
| 5,812,937 A | 9/1998 | Takahisa et al. |
| 5,815,146 A | 9/1998 | Youden et al. |
| 5,818,438 A | 10/1998 | Howe et al. |
| 5,819,019 A | 10/1998 | Nelson |
| 5,819,156 A | 10/1998 | Belmont |
| 5,819,160 A | 10/1998 | Foladare et al. |
| 5,822,530 A | 10/1998 | Brown |
| 5,825,968 A | 10/1998 | Nishigaki et al. |
| 5,828,945 A | 10/1998 | Klosterman |
| RE35,954 E | 11/1998 | Levine |
| 5,838,314 A | 11/1998 | Neel et al. |
| 5,841,979 A | 11/1998 | Schulhof et al. |
| 5,844,620 A | 12/1998 | Coleman et al. |
| 5,850,218 A | 12/1998 | LaJoie et al. |
| 5,859,641 A | 1/1999 | Cave |
| 5,861,906 A | 1/1999 | Dunn et al. |
| 5,867,483 A | 2/1999 | Ennis et al. |
| 5,880,768 A | 3/1999 | Lemmons et al. |
| 5,881,245 A | 3/1999 | Thompson |
| 5,884,028 A | 3/1999 | Kindell et al. |
| 5,886,707 A | 3/1999 | Berg |
| 5,886,732 A | 3/1999 | Humpleman |
| 5,887,243 A | 3/1999 | Harvey et al. |
| 5,892,915 A | 4/1999 | Duso et al. |
| 5,894,589 A | 4/1999 | Reber et al. |
| 5,896,414 A | 4/1999 | Meyer et al. |
| 5,898,441 A | 4/1999 | Flurry |
| 5,898,456 A | 4/1999 | Wahl |
| 5,899,582 A | 5/1999 | DuLac |
| 5,900,904 A | 5/1999 | Okada et al. |
| 5,903,234 A | 5/1999 | Kimura |
| 5,903,263 A | 5/1999 | Emura |
| 5,903,264 A | 5/1999 | Moeller et al. |
| 5,905,522 A | 5/1999 | Lawler |
| 5,905,847 A | 5/1999 | Kobayashi et al. |
| 5,909,638 A | 6/1999 | Allen |
| 5,911,046 A | 6/1999 | Amano |
| 5,913,039 A | 6/1999 | Nakamura et al. |
| 5,914,941 A | 6/1999 | Janky |
| 5,915,090 A | 6/1999 | Joseph et al. |
| 5,915,094 A | 6/1999 | Kouloheris et al. |
| 5,916,303 A | 6/1999 | Scott |
| 5,917,538 A | 6/1999 | Asamizuya |
| 5,917,835 A | 6/1999 | Barrett et al. |
| 5,920,702 A | 7/1999 | Bleidt et al. |
| 5,920,800 A | 7/1999 | Schäfer |
| 5,922,045 A | 7/1999 | Hanson |
| 5,922,048 A | 7/1999 | Emura |
| 5,923,361 A | 7/1999 | Sutton, Jr. |
| 5,926,204 A | 7/1999 | Mayer |
| 5,926,205 A | 7/1999 | Krause et al. |
| 5,926,624 A | 7/1999 | Katz et al. |
| 5,928,327 A | 7/1999 | Wang et al. |
| 5,929,850 A | 7/1999 | Broadwin et al. |
| 5,930,473 A | 7/1999 | Teng et al. |
| 5,930,493 A | 7/1999 | Ottesen et al. |
| 5,931,901 A | 8/1999 | Wolfe et al. |
| 5,933,603 A | 8/1999 | Vahalia et al. |
| 5,933,835 A | 8/1999 | Adams et al. |
| 5,935,206 A | 8/1999 | Dixon et al. |
| 5,936,569 A | 8/1999 | Ståhle et al. |
| 5,940,071 A | 8/1999 | Treffers et al. |
| 5,940,073 A | 8/1999 | Klosterman et al. |
| 5,940,572 A | 8/1999 | Balaban et al. |
| 5,943,046 A | 8/1999 | Cave et al. |
| 5,943,047 A | 8/1999 | Suzuki |
| 5,945,987 A | 8/1999 | Dunn |
| 5,947,746 A | 9/1999 | Tsai |
| 5,949,411 A | 9/1999 | Doerr et al. |
| 5,949,954 A | 9/1999 | Young et al. |
| 5,956,482 A | 9/1999 | Agraharam et al. |
| 5,959,592 A | 9/1999 | Petruzzelli |
| 5,959,659 A | 9/1999 | Dokic |
| 5,963,202 A | 10/1999 | Polish |
| 5,963,264 A | 10/1999 | Jackson |
| 5,964,455 A | 10/1999 | Catanzarite et al. |
| 5,969,714 A | 10/1999 | Butcher |

(56) References Cited

U.S. PATENT DOCUMENTS

| | | | |
|---|---|---|---|
| 5,969,748 A | 10/1999 | Casement et al. | |
| 5,973,680 A | 10/1999 | Ueda | |
| 5,973,722 A | 10/1999 | Wakai et al. | |
| 5,974,217 A | 10/1999 | Haraguchi | |
| 5,974,222 A | 10/1999 | Yuen et al. | |
| 5,977,963 A | 11/1999 | Gaughan et al. | |
| 5,977,964 A | 11/1999 | Williams et al. | |
| 5,978,567 A | 11/1999 | Rebane et al. | |
| 5,978,843 A | 11/1999 | Wu et al. | |
| 5,986,650 A | 11/1999 | Ellis et al. | |
| 5,987,213 A | 11/1999 | Mankovitz et al. | |
| 5,990,881 A | 11/1999 | Inoue et al. | |
| 5,995,155 A | 11/1999 | Schindler et al. | |
| 5,999,970 A | 12/1999 | Krisbergh et al. | |
| 6,002,394 A | 12/1999 | Schein et al. | |
| 6,002,720 A | 12/1999 | Yurt et al. | |
| 6,005,564 A | 12/1999 | Ahmad et al. | |
| 6,005,600 A | 12/1999 | Hill | |
| 6,009,465 A | 12/1999 | Decker et al. | |
| 6,012,089 A | 1/2000 | Hasegawa | |
| 6,012,091 A | 1/2000 | Boyce | |
| 6,014,184 A | 1/2000 | Knee et al. | |
| 6,014,381 A | 1/2000 | Troxel et al. | |
| 6,014,693 A | 1/2000 | Ito et al. | |
| 6,014,694 A | 1/2000 | Aharoni et al. | |
| 6,014,706 A | 1/2000 | Cannon et al. | |
| 6,018,359 A | 1/2000 | Kermode et al. | |
| 6,018,765 A | 1/2000 | Durana et al. | |
| 6,020,912 A | 2/2000 | De Lang | |
| 6,022,223 A | 2/2000 | Taniguchi et al. | |
| 6,023,725 A | 2/2000 | Ozawa et al. | |
| 6,025,868 A | 2/2000 | Russo | |
| 6,028,600 A | 2/2000 | Rosin et al. | |
| 6,029,064 A | 2/2000 | Farris et al. | |
| 6,038,367 A | 3/2000 | Abecassis | |
| 6,038,591 A | 3/2000 | Wolfe et al. | |
| 6,052,145 A | 4/2000 | Macrae et al. | |
| 6,057,890 A | 5/2000 | Virden et al. | |
| 6,058,242 A | 5/2000 | Kim | |
| 6,081,291 A | 6/2000 | Ludwig, Jr. | |
| 6,091,883 A | 7/2000 | Artigalas et al. | |
| 6,091,884 A | 7/2000 | Yuen et al. | |
| RE36,801 E | 8/2000 | Logan et al. | |
| 6,133,910 A | 10/2000 | Stinebruner | |
| 6,141,488 A | 10/2000 | Knudson et al. | |
| 6,154,771 A | 11/2000 | Rangan et al. | |
| 6,157,377 A | 12/2000 | Shah Nazaroff et al. | |
| 6,157,413 A | 12/2000 | Hanafee et al. | |
| 6,160,546 A | 12/2000 | Thompson et al. | |
| 6,163,316 A | 12/2000 | Killian | |
| 6,177,931 B1 | 1/2001 | Alexander et al. | |
| 6,185,360 B1 | 2/2001 | Inoue et al. | |
| 6,185,736 B1 | 2/2001 | Ueno | |
| 6,208,335 B1 | 3/2001 | Gordon et al. | |
| 6,208,799 B1 | 3/2001 | Marsh et al. | |
| 6,233,389 B1 | 5/2001 | Barton et al. | |
| 6,240,460 B1 | 5/2001 | Mitsutake et al. | |
| 6,252,629 B1 * | 6/2001 | Takatori | H04N 5/782 348/460 |
| 6,275,648 B1 | 8/2001 | Knudson et al. | |
| 6,314,575 B1 | 11/2001 | Billock et al. | |
| 6,323,911 B1 | 11/2001 | Schein | |
| 6,324,338 B1 | 11/2001 | Wood et al. | |
| 6,327,418 B1 | 12/2001 | Barton et al. | |
| 6,348,932 B1 | 2/2002 | Nishikawa | |
| 6,388,714 B1 | 5/2002 | Schein | |
| 6,430,358 B1 | 8/2002 | Yuen et al. | |
| 6,430,359 B1 | 8/2002 | Yuen et al. | |
| 6,438,596 B1 | 8/2002 | Ueno et al. | |
| 6,442,332 B1 | 8/2002 | Knudson et al. | |
| 6,473,559 B1 | 10/2002 | Knudson et al. | |
| 6,490,722 B1 | 12/2002 | Barton et al. | |
| 6,505,348 B1 | 1/2003 | Knowles et al. | |
| 6,553,376 B1 | 4/2003 | Lewis et al. | |
| 6,564,005 B1 | 5/2003 | Berstis | |
| 6,611,958 B1 | 8/2003 | Shintani et al. | |
| 6,681,396 B1 | 1/2004 | Bates et al. | |
| 6,735,487 B1 | 5/2004 | Marshall et al. | |
| 6,744,967 B2 | 6/2004 | Kaminski et al. | |
| 6,757,907 B1 | 6/2004 | Schumacher et al. | |
| 6,760,538 B1 | 7/2004 | Bumgardner et al. | |
| 6,771,885 B1 | 8/2004 | Agnihotri et al. | |
| 6,771,886 B1 | 8/2004 | Mendelsohn | |
| 6,857,132 B1 | 2/2005 | Rakib et al. | |
| 6,901,209 B1 | 5/2005 | Cooper et al. | |
| 7,088,910 B2 | 8/2006 | Potrebic et al. | |
| 7,096,486 B1 | 8/2006 | Ukai et al. | |
| 7,151,886 B2 | 12/2006 | Young et al. | |
| 7,185,355 B1 | 2/2007 | Ellis et al. | |
| 7,242,988 B1 | 7/2007 | Hoffberg et al. | |
| 7,293,276 B2 | 11/2007 | Phillips et al. | |
| 7,356,246 B1 | 4/2008 | Kobb | |
| 7,519,268 B2 | 4/2009 | Juen et al. | |
| 7,600,246 B2 | 10/2009 | Taylor et al. | |
| 7,853,120 B2 | 12/2010 | Bumgardner et al. | |
| 7,979,881 B1 * | 7/2011 | Wong | H04N 5/44543 725/51 |
| 8,176,516 B2 | 5/2012 | Krakirian et al. | |
| 8,532,466 B2 | 9/2013 | Bumgardner et al. | |
| 8,873,938 B2 * | 10/2014 | Mountain | H04N 5/76 386/228 |
| 9,253,462 B2 * | 2/2016 | Kummer | H04N 5/782 |
| 2001/0024470 A1 | 9/2001 | Radha et al. | |
| 2001/0037508 A1 | 11/2001 | Hindus et al. | |
| 2002/0044764 A1 * | 4/2002 | Akamatsu | H04L 12/40117 386/291 |
| 2002/0054068 A1 | 5/2002 | Ellis et al. | |
| 2002/0057893 A1 | 5/2002 | Wood et al. | |
| 2002/0059599 A1 | 5/2002 | Schein et al. | |
| 2002/0081096 A1 | 6/2002 | Watanabe et al. | |
| 2002/0144279 A1 | 10/2002 | Zhou | |
| 2002/0174430 A1 | 11/2002 | Ellis et al. | |
| 2002/0174433 A1 | 11/2002 | Baumgartner et al. | |
| 2002/0191954 A1 | 12/2002 | Beach et al. | |
| 2003/0009766 A1 | 1/2003 | Marolda | |
| 2003/0061619 A1 | 3/2003 | Giammaressi | |
| 2003/0070183 A1 * | 4/2003 | Pierre | H04N 7/088 725/135 |
| 2003/0126607 A1 | 7/2003 | Phillips et al. | |
| 2003/0149988 A1 | 8/2003 | Ellis et al. | |
| 2003/0194200 A1 * | 10/2003 | Yuen et al. | 386/46 |
| 2003/0198461 A1 | 10/2003 | Taylor et al. | |
| 2003/0206719 A1 | 11/2003 | Bumgardner et al. | |
| 2003/0210898 A1 | 11/2003 | Juen et al. | |
| 2004/0003413 A1 * | 1/2004 | Boston et al. | 725/133 |
| 2004/0013409 A1 | 1/2004 | Beach et al. | |
| 2004/0103434 A1 | 5/2004 | Ellis et al. | |
| 2004/0181814 A1 | 9/2004 | Ellis et al. | |
| 2005/0044577 A1 | 2/2005 | Jerding et al. | |
| 2005/0071882 A1 | 3/2005 | Rodriquez et al. | |
| 2005/0097619 A1 | 5/2005 | Haddad | |
| 2005/0198671 A1 | 9/2005 | Hanai et al. | |
| 2005/0198677 A1 | 9/2005 | Lewis | |
| 2005/0204388 A1 | 9/2005 | Knudson et al. | |
| 2005/0235323 A1 | 10/2005 | Ellis et al. | |
| 2005/0240968 A1 | 10/2005 | Knudson et al. | |
| 2005/0273819 A1 | 12/2005 | Knudson et al. | |
| 2006/0051059 A1 | 3/2006 | Krakirian et al. | |
| 2006/0140584 A1 | 6/2006 | Ellis et al. | |
| 2007/0280635 A1 * | 12/2007 | Huang | H04N 5/782 386/297 |

FOREIGN PATENT DOCUMENTS

| | | |
|---|---|---|
| DE | 3527939 | 2/1987 |
| DE | 3623924 | 2/1988 |
| DE | 3921847 | 1/1991 |
| DE | 4240187 | 6/1994 |
| EP | 0 051 228 | 5/1982 |
| EP | 0337336 | 10/1989 |
| EP | 393955 | 10/1990 |
| EP | 0 424 469 | 5/1991 |
| EP | 0 444 496 | 9/1991 |

(56) References Cited

FOREIGN PATENT DOCUMENTS

| | | |
|---|---|---|
| EP | 0 447 968 | 9/1991 |
| EP | 0 488 379 | 6/1992 |
| EP | 0 535 749 | 4/1993 |
| EP | 0 572 090 | 12/1993 |
| EP | 0 624 039 | 11/1994 |
| EP | 0 662 771 | 7/1995 |
| EP | 0 682 452 | 11/1995 |
| EP | 0682452 | 11/1995 |
| EP | 0 711 076 | 5/1996 |
| EP | 0 725 539 | 8/1996 |
| EP | 0 753 964 | 1/1997 |
| EP | 0753964 | 1/1997 |
| EP | 0 758 833 | 2/1997 |
| EP | 0 763 938 | 3/1997 |
| EP | 0 836 320 | 4/1998 |
| EP | 0836320 | 4/1998 |
| EP | 0 854 645 | 7/1998 |
| EP | 0854645 | 7/1998 |
| EP | 0 874 524 | 10/1998 |
| EP | 0 924 927 | 6/1999 |
| EP | 0 940 983 | 9/1999 |
| EP | 0 944 253 | 9/1999 |
| EP | 0940983 | 9/1999 |
| EP | 0 986 046 | 3/2000 |
| GB | 1 370 535 | 10/1974 |
| GB | 2155713 | 9/1985 |
| GB | 2210526 | 6/1989 |
| GB | 2217144 | 10/1989 |
| GB | 2 227 622 | 8/1990 |
| GB | 2227622 | 8/1990 |
| GB | 2 229 595 | 9/1990 |
| GB | 2229595 | 9/1990 |
| GB | 2 256 115 | 11/1992 |
| GB | 2 346 251 | 8/2000 |
| GB | 2346251 | 8/2000 |
| JP | 61-109379 | 5/1986 |
| JP | 61-227486 | 10/1986 |
| JP | 62-008389 | 1/1987 |
| JP | 62-49528 | 3/1987 |
| JP | 62-60384 | 3/1987 |
| JP | 62-066493 | 3/1987 |
| JP | 62-125077 | 6/1987 |
| JP | 62-198768 | 9/1987 |
| JP | 63-54884 | 3/1988 |
| JP | 63-141467 | 6/1988 |
| JP | 63-247812 | 10/1988 |
| JP | 63-276069 | 11/1988 |
| JP | 63-299582 | 12/1988 |
| JP | 1-078328 | 3/1989 |
| JP | 1-142918 | 6/1989 |
| JP | 1-150928 | 6/1989 |
| JP | 1-209399 | 8/1989 |
| JP | 1-212986 | 8/1989 |
| JP | 1-307944 | 12/1989 |
| JP | 2-838892 | 12/1989 |
| JP | 2-113318 | 4/1990 |
| JP | 2-189753 | 7/1990 |
| JP | 60-61935 | 3/1994 |
| JP | 08-130517 | 5/1996 |
| JP | 8-130517 | 5/1996 |
| JP | 10-021601 | 1/1998 |
| JP | 10 065978 | 3/1998 |
| JP | 10-247344 | 9/1998 |
| JP | 10-257400 | 9/1998 |
| JP | 11 032272 | 2/1999 |
| JP | 11 205711 | 7/1999 |
| JP | 2000-13708 | 1/2000 |
| JP | 2000-138886 | 5/2000 |
| JP | 2000-224533 | 8/2000 |
| JP | 2000-235546 | 8/2000 |
| JP | 2000-306314 | 11/2000 |
| JP | 2001-88372 | 4/2001 |
| JP | 2001-165669 | 6/2001 |
| JP | 2001-167522 | 6/2001 |
| JP | 2001-257950 | 9/2001 |
| TW | 247388 | 10/1994 |
| WO | WO 87/00884 | 2/1987 |
| WO | WO 88/04507 | 6/1988 |
| WO | WO 89/03085 | 4/1989 |
| WO | WO 89/12370 | 12/1989 |
| WO | WO 90/00847 | 1/1990 |
| WO | WO 91/00670 | 1/1991 |
| WO | WO 92/04801 | 3/1992 |
| WO | WO 92/22983 | 12/1992 |
| WO | WO-1992022983 | 12/1992 |
| WO | WO 93/08542 | 4/1993 |
| WO | WO 93/22877 | 11/1993 |
| WO | WO 93/23957 | 11/1993 |
| WO | WO-1993023957 | 11/1993 |
| WO | WO 95/01058 | 1/1995 |
| WO | WO 95/15658 | 6/1995 |
| WO | WO 95/31069 | 11/1995 |
| WO | WO 95/32583 | 11/1995 |
| WO | WO 95/32584 | 11/1995 |
| WO | WO 95/32585 | 11/1995 |
| WO | WO 95/32587 | 11/1995 |
| WO | WO-1995032587 | 11/1995 |
| WO | WO 96/09721 | 3/1996 |
| WO | WO 96/17467 | 6/1996 |
| WO | WO 96/25821 | 8/1996 |
| WO | WO 96/26605 | 8/1996 |
| WO | WO-1996026605 | 8/1996 |
| WO | WO 96/33572 | 10/1996 |
| WO | WO 96/34467 | 10/1996 |
| WO | WO 96/36172 | 11/1996 |
| WO | WO 96/37075 | 11/1996 |
| WO | WO-1996036172 | 11/1996 |
| WO | WO-1996037075 | 11/1996 |
| WO | WO 96/41472 | 12/1996 |
| WO | WO 96/41478 | 12/1996 |
| WO | WO-1996041478 | 12/1996 |
| WO | WO 97/07050 | 2/1997 |
| WO | WO 97/13368 | 4/1997 |
| WO | WO-1997013368 | 4/1997 |
| WO | WO 97/21291 | 6/1997 |
| WO | WO 97/32434 | 9/1997 |
| WO | WO 97/34413 | 9/1997 |
| WO | WO 97/34414 | 9/1997 |
| WO | WO 97/37500 | 10/1997 |
| WO | WO 97/42763 | 11/1997 |
| WO | WO 97/46016 | 12/1997 |
| WO | WO 97/46943 | 12/1997 |
| WO | WO 97/47124 | 12/1997 |
| WO | WO 97/48228 | 12/1997 |
| WO | WO 97/48230 | 12/1997 |
| WO | WO 97/49237 | 12/1997 |
| WO | WO-1997048230 | 12/1997 |
| WO | WO 98/01995 | 1/1998 |
| WO | WO 98/06219 | 2/1998 |
| WO | WO 98/07277 | 2/1998 |
| WO | WO-1998006219 | 2/1998 |
| WO | WO 98/10589 | 3/1998 |
| WO | WO 98/12872 | 3/1998 |
| WO | WO 98/17033 | 4/1998 |
| WO | WO 98/17064 | 4/1998 |
| WO | WO 98/18260 | 4/1998 |
| WO | WO 98/19459 | 5/1998 |
| WO | WO 98/26528 | 6/1998 |
| WO | WO 98/26584 | 6/1998 |
| WO | WO 98/26596 | 6/1998 |
| WO | WO 98/31115 | 7/1998 |
| WO | WO 98/31116 | 7/1998 |
| WO | WO 98/34405 | 8/1998 |
| WO | WO 98/38831 | 9/1998 |
| WO | WO 98/47279 | 10/1998 |
| WO | WO 98/48566 | 10/1998 |
| WO | WO-1998048566 | 10/1998 |
| WO | WO 99/03267 | 1/1999 |
| WO | WO 99/04561 | 1/1999 |
| WO | WO 99/11060 | 3/1999 |
| WO | WO 99/12320 | 3/1999 |
| WO | WO 99/27681 | 6/1999 |
| WO | WO 99/28897 | 6/1999 |
| WO | WO 99/39466 | 8/1999 |

(56) References Cited

FOREIGN PATENT DOCUMENTS

| | | |
|---|---|---|
| WO | WO 99/45700 | 9/1999 |
| WO | WO-1999045700 | 9/1999 |
| WO | WO 99/52279 | 10/1999 |
| WO | WO-1999052279 | 10/1999 |
| WO | WO 99/56473 | 11/1999 |
| WO | WO 99/60790 | 11/1999 |
| WO | WO 99/65244 | 12/1999 |
| WO | WO 99/66725 | 12/1999 |
| WO | WO-1999066725 | 12/1999 |
| WO | WO 00/04706 | 1/2000 |
| WO | WO-2000004706 | 1/2000 |
| WO | WO 00/05885 | 2/2000 |
| WO | WO 00/07368 | 2/2000 |
| WO | WO 00/08850 | 2/2000 |
| WO | WO 00/08851 | 2/2000 |
| WO | WO 00/08852 | 2/2000 |
| WO | WO-2000007368 | 2/2000 |
| WO | WO-2000008850 | 2/2000 |
| WO | WO-2000008851 | 2/2000 |
| WO | WO-2000008852 | 2/2000 |
| WO | WO 00/11869 | 3/2000 |
| WO | WO 00/16548 | 3/2000 |
| WO | WO-2000016548 | 3/2000 |
| WO | WO 00/28739 | 5/2000 |
| WO | WO-2000028739 | 5/2000 |
| WO | WO 00/33560 | 6/2000 |
| WO | WO 00/58833 | 10/2000 |
| WO | WO 00/58967 | 10/2000 |
| WO | WO 00/59214 | 10/2000 |
| WO | WO 00/59223 | 10/2000 |
| WO | WO 00/62298 | 10/2000 |
| WO | WO 00/62299 | 10/2000 |
| WO | WO 00/62533 | 10/2000 |
| WO | WO-2000058833 | 10/2000 |
| WO | WO-2000058967 | 10/2000 |
| WO | WO-2000059214 | 10/2000 |
| WO | WO-2000059223 | 10/2000 |
| WO | WO-2000062298 | 10/2000 |
| WO | WO-2000062299 | 10/2000 |
| WO | WO-2000062533 | 10/2000 |
| WO | WO 00/67475 | 11/2000 |
| WO | WO-2000067475 | 11/2000 |
| WO | WO 01/01677 | 1/2001 |
| WO | WO 01/01689 | 1/2001 |
| WO | WO-2001001677 | 1/2001 |
| WO | WO 01/22729 | 3/2001 |
| WO | WO-2001022729 | 3/2001 |
| WO | WO 01/35662 | 5/2001 |
| WO | WO 01/46843 | 6/2001 |
| WO | WO 01/47238 | 6/2001 |
| WO | WO 01/47249 | 6/2001 |
| WO | WO 01/47257 | 6/2001 |
| WO | WO 01/47273 | 6/2001 |
| WO | WO 01/47279 | 6/2001 |
| WO | WO-2001046843 | 6/2001 |
| WO | WO-2001047238 | 6/2001 |
| WO | WO-2001047249 | 6/2001 |
| WO | WO-2001047257 | 6/2001 |
| WO | WO-2001047273 | 6/2001 |
| WO | WO-2001047279 | 6/2001 |
| WO | WO 01/50743 | 7/2001 |
| WO | WO 01/76239 | 10/2001 |
| WO | WO 01/76248 | 10/2001 |
| WO | WO-2001076239 | 10/2001 |
| WO | WO-2001076248 | 10/2001 |
| WO | WO 02/078317 | 10/2002 |
| WO | WO-2002078317 | 10/2002 |

OTHER PUBLICATIONS

"DIRECTV Receiver—Owner's Manual," DIRECTV, Inc. (2002).
DIRECTV Receiver with TiVo Digital Satellite ReceiverlRecorder SAT-T60—Installation Guide.
"DIRECTV Receiver with TiVo Installation Guide," Philips (2000).
"DIRECTV Receiver with TiVo Viewer's Guide" (1999, 2000).
"DishPro Satellite System—User's Guide," Dish Network (undated).
"Electronic Programme Guide (EPG); Protocol for a TV Guide using electronic data transmission," by European Telecommunication Standards Institute, May 1997, Valboone, France, publication No. ETS 300 707.
"Fall 2001 TiVo Service Update with Dual Tuner!," TiVo Inc. (2001).
"PTV Recorder Setup Guide," Philips (2000).
"RCA Satellite Receiver User's Guide," Thomson multimedia Inc. (2001).
"Start Here," Sony, TiVo and DIRECTV (undated).
"Advanced Analog Systems—Addressable Terminals," General Instrument Corp. of Horsham, Pennsylvania, (http//www.gi.com/BUSAREA/ANALOG/TERMINAL/WATCH/watch.html), printed from the internet on Mar. 4, 1999.
User's Guide RCA Color TV with TV Plus + Guide, 1997.
DIRECTV Receiver with TiVo Digital Satellite Receiver Recorder Sat-T60—Installation Guide Corporation (2000).
James, A., "Oracle-Broadcasting the Written Word," Wireless World, Jul. 1973.
Edwardson et al., "CEEFAX: A Proposed New Broadcasting Service," SMPTE Journal, Jan. 1974, vol. 83, pp. 14-19.
Edmondson et al., "NBC Switching Central," SMPTE Journal, Oct. 1976, vol. 85, No. 10, pp. 795-805.
Roizen, Joseph, "Teletext in USA," Jul. 1981, pp. 602-610.
Hoffman et al., "Videotext Programmiert Videorecorder," Sep. 1982, 9 pages.
Printed materials on "Time's Teletext Service," 1982-1983, pp. V79175, V79142, V79143, V79148, and V79151.
Symposium Record Broadcast Sessions, 14th International TV Symposium, Montreux, Switzerland, Jun. 6-12, 1985, 9 pages.
Von Gerhard Eitz and Karl-Ulrich Oberlies, "Videotext Programmiert Videoheimgerate (VPV)," Sep. 1986, pp. 223-229; translation of abstract included.
Kruger, H. Eckart, "Digital Video Identification System VIS," German, 9 pages, 1982.
Ziesel et al.; "An Interactive Menu-Driven Remote Control Unite for TV-Receivers and VC-Recorders," IEEE Transactions on Consumer Electronics, Aug. 1988, vol. 34, No. 3, pp. 814-818.
Philips Consumer Electronics, Users Manual, Matchline 28DC2070, 33DC2080; obtained Mar. 31, 2009.
Page 12 of Philips TV 21SL5756/00B User Manual; obtained Mar. 31, 2009.
TV Guide, San Francisco Metropolitan Schedule, Feb. 6, 1989.
Systems as described in DIP II Advertisement "Program Listings Never Looked So Good", English Translation of A. Bismuth, vol. 54, No. 3, pp. 46-50, Feb. 8, 2005.
System as described in Cable Data Advertisement "There's more to one-way addressability than meets the eye"; vol. 7, No. 30, Apr. 15, 1982.
CableData brochure, "A New Approach to Addressability" (undated).
"Addressable Converters: A New Development at CableData," Via Cable, vol. 1, No. 12 (Dec. 1981).
Sorce, J., et al.; "Designing a Broadband Residential Entertainment Service: A Case Study," 13th International Symposium Human Factors in Telecommunications, Torino, Italy, Sep. 10-14, 1990 pp. 141-148.
BrugLiera, V., "Digital On-Screen Display—A new Technology for the Consumer Interface," Symposium Record Cable Sessions, 18th International Television Symposium and Technical Exhibition, Montreux, Switzerland Jun. 10-15, 1993, pp. 571-586 (Jun. 11, 1993).
Miller, M.D., "A Scenario for the Deployment of Interactive Multimedia Cable Television Systems in the United States in the 1990's", Proceedings of the IEEE, vol. 82, No. 4, pp. 585-589 (Apr. 1994).
Chang, Y., et al.; "An Open-Systems Approach to Video on Demand," IEEE Communications Magazine, vol. 32, No. 5, pp. 68-80 (May 1994).

(56) References Cited

OTHER PUBLICATIONS

Article: "Windows 98 Feature Combines TV, Terminal and the Internet," New York Times, Aug. 19, 1998.
The New York Times Website Article, "2 Makers Plan Introductions of Digital VCR," by John Markoff, Mar. 29, 1999.
David M. Rudnick, U.S. Appl. No. 09/283,681, filed Apr. 1, 1999, entitled "Interactive Television Program Guide System Having Graphic Arrangements of Program Event Regions".
European Search Report for EP 10179880 dated Jan. 12, 2011.
U.S. Appl. No. 09/821,005, filed Mar. 29, 2001.
U.S. Appl. No. 12/634,154, filed Dec. 9, 2009.
U.S. Appl. No. 12/775,025, filed May 6, 2010.
U.S. Appl. No. 09/330,792, filed Jun. 11, 1999.
U.S. Appl. No. 10/105,128, filed Feb. 21, 2002.
U.S. Appl. No. 10/707,834, filed Jan. 15, 2004.
U.S. Appl. No. 10/936,417, filed Sep. 8, 2004.

\* cited by examiner

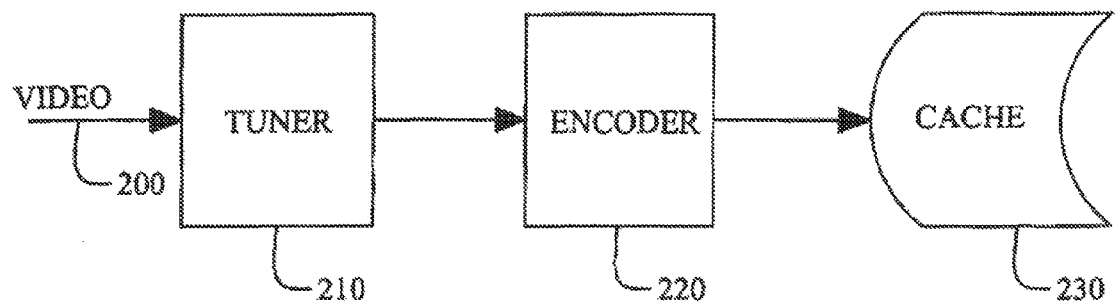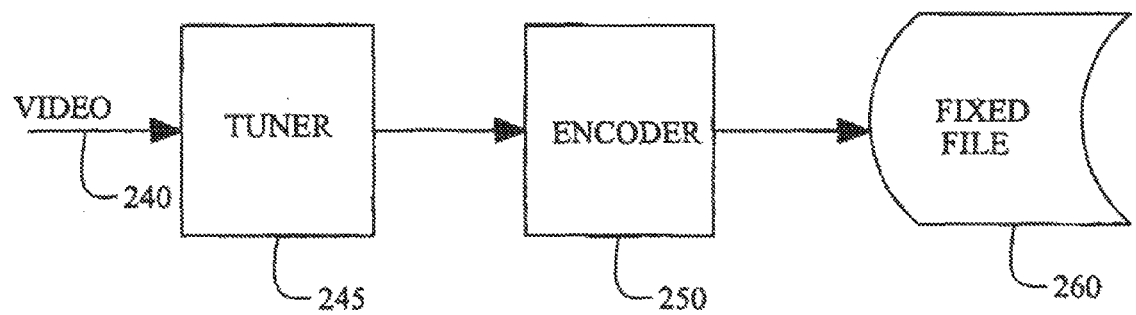
FIG. 2

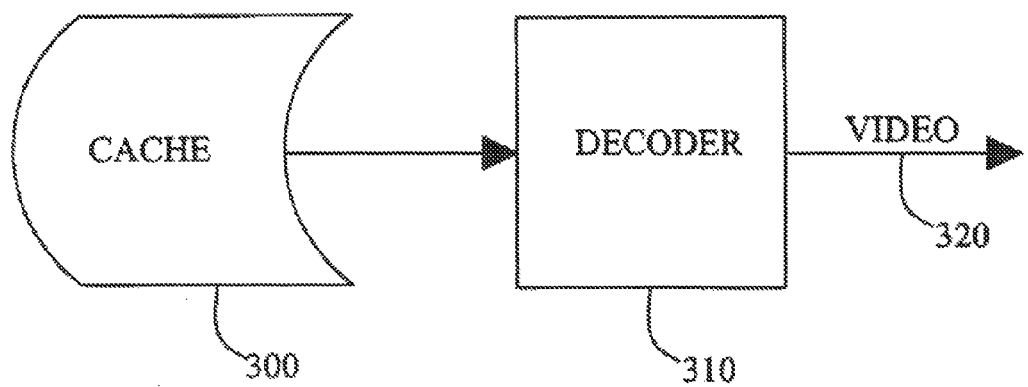
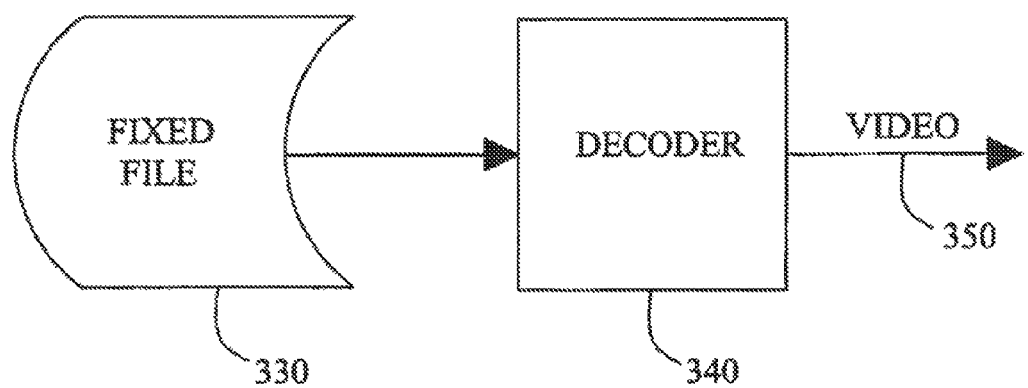
FIG. 3

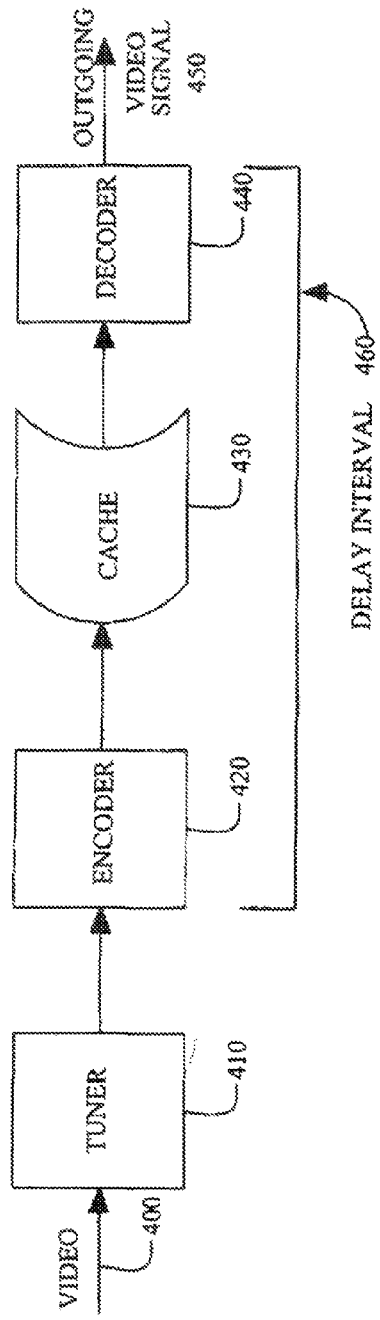
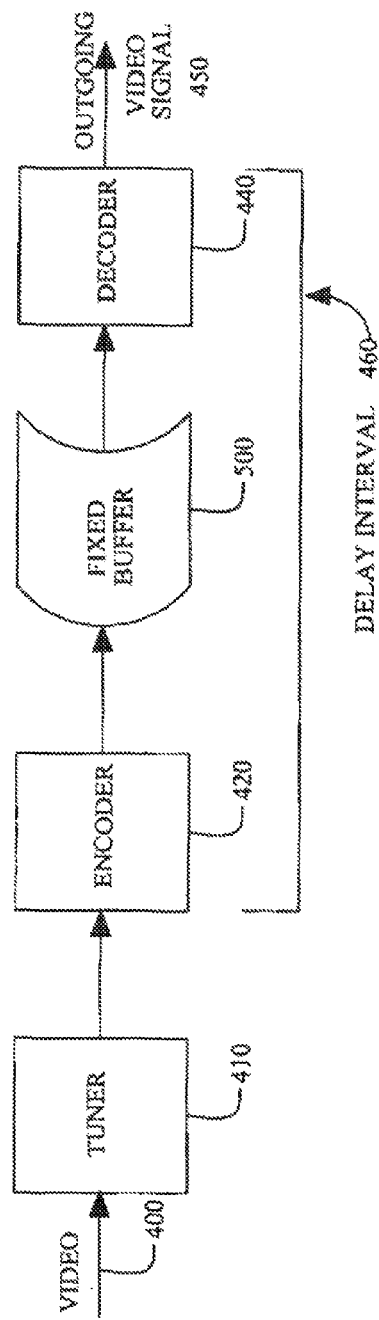

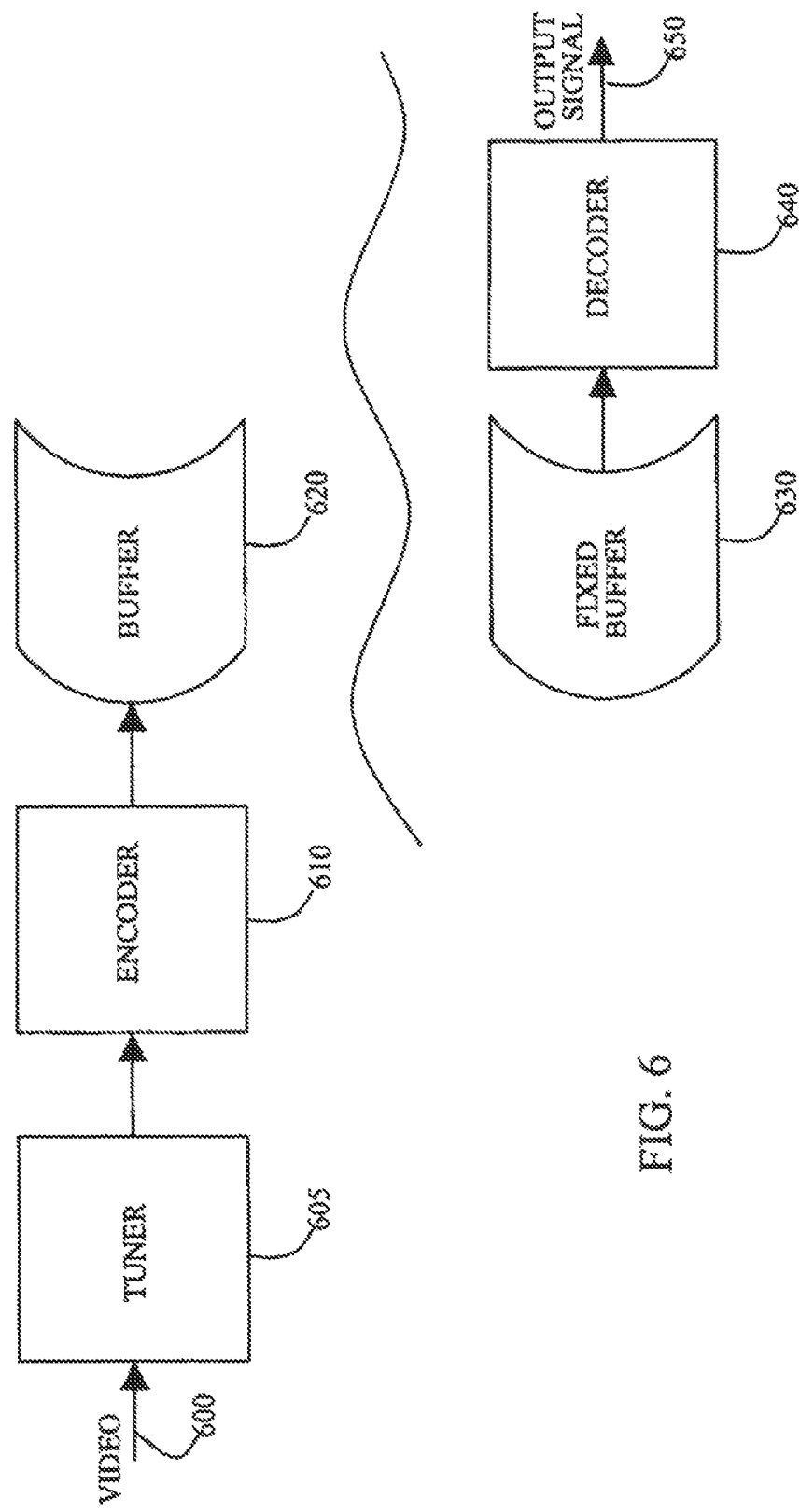

VIDEO RECORDER HAVING USER EXTENDED AND AUTOMATICALLY EXTENDED TIME SLOTS

CROSS-REFERENCE TO RELATED APPLICATIONS

This application is a continuation of application Ser. No. 12/626,267, filed Nov. 25, 2009, (allowed) which is a continuation of Ser. No. 10/936,417, filed Sep. 8, 2004, (abandoned), which is a continuation-in-part of application Ser. No. 10/707,834, filed Jan. 15, 2004, now U.S. Pat. No. 7,853,120, which is a continuation of Ser. No. 10/249,575, filed Apr. 21, 2003, now U.S. Pat. No. 6,760,638, issued Jul. 6, 2004. These prior applications are hereby incorporated by reference herein in their entirety.

NOTICE OF MATERIAL SUBJECT TO COPYRIGHT PROTECTION

All of the material in this patent document is subject to copyright protection under the copyright laws of the United States and of other countries. The owner of the copyright has no objection to the facsimile reproduction by anyone of the patent document or the patent disclosure, as it appears in the United States Patent and Trademark Office file or records, but otherwise reserves all copyrights whatsoever.

BACKGROUND OF THE INVENTION

1. Field of the Invention

The present invention relates generally to systems that transfer broadcast content to volatile and/or non-volatile storage devices.

2. Background of the Invention

The capture of broadcast content gained major popularity with the advent of the VCR. A user was able to tune their television to a station that had a show that they wanted to save and they simply inserted a storage device (e.g., a VHS tape), moved the tape to the appropriate location, and began capturing the broadcast. Recently, other types of equipment have developed to perform similar functionality. These types of equipment include, for instance, DVD recorders (DVD-R) and set-top boxes that include digital video recorders.

Both of these types of equipment are used in a manner that is similar to the operation of VCRs. Each has its own storage device (i.e., a DVD or hard drive) and each storage device is of finite space. If a user is saving a long program, multiple programs, or begins saving the program when the storage device is nearly full, there is a chance that the program the user is trying to save will be lost. This is a frustrating problem for the average user, specifically when they want to save content when they are away from the home.

Saving Broadcast Content

Saving broadcast content in its simplest form comprises turning on the television set and pressing a button on a VCR. More recently, VCRs, DVD-Rs, and digital video recorders (DVR), include interfaces which allow users to schedule the transfer of programs at a later date or time. Using this interface, the user is able to give the device a time and a channel and when it is the right time the device tunes to the channel, and begins saving the program. This is useful, for instance, when the user is away from home and wants to see the program later.

Another modern interface allows the user to focus on a favorite program. For instance, a user may love "Monday Night Football", which occurs every Monday night from 6:00 P.M. to 9:00 P.M. So, the user may wish to transfer this broadcast to a storage device regardless of whether they are home or not and may not want to have to instruct the machine every time. Using the interface, the user is able to set the system to save content for the three hours on Monday night when the football game is broadcast every week.

Tuner Conflicts

However, these schemes are inadequate because conflicts may arise in the scheduling system. Typically, a system is limited by the number of tuners it has. A one tuner system, for instance can either be used to save a program on a specific channel or watch the channel, however, the system cannot save content on one station and be used to watch another station. A two tuner system can be used to transfer and watch two different stations. Situations arise, however, where the system has been given instructions to transfer multiple shows simultaneously and there are not enough available tuners to perform this function.

Show Prioritization

One technique prioritizes shows scheduled to be transferred and when a conflict arises only the highest priority show is transferred. This technique is limited, however, because sometimes a user extends a timeslot in the transfer schedule to a few minutes before and a few minutes after the actual show. The user might do this because, for instance, they might want to save part of a pre-game show for a sports event, or they might want to save content after a sports event, if it goes into overtime. Moreover, the system might automatically extend time slots by brief periods automatically to avoid missing content if the broadcaster's clock and the system's clock are out of sync or if the broadcast starts a few minutes early or late.

In such a case, a conflict may arise solely because of a user extended or automatically extended time slot. If these additional time slots are not treated as separate entities, unexpected results may occur. For instance a high priority first show may override a lower priority second show and cause the second show to not be saved merely because the first show overlapped the second show by an automatically extended minute or two. Such a result is clearly inadequate.

SUMMARY OF THE INVENTION

The present invention is directed to a video recorder having user extended and automatically extended time slots. An embodiment of the present invention includes a set-top box having an internal storage device, such as a hard drive where broadcasts are transferred from a broadcast input source to the storage device and are played back from the storage device to an output device, such as a television or computer monitor. The set-top box displays a graphical user interface (GUI) and an interactive program guide (IPG) on the output device. The IPG displays a list of shows that are available by tuning to different channels at different times as well as descriptions and details about each show. The GUI allows the user to navigate through the IPG, for instance, by viewing different times and dates for broadcasts, and also allows the user to view the shows that are scheduled to be transferred to the storage device in the future, and the shows that have already been transferred to the storage device.

The GUI also allows the user to Utilize a video recorder, for instance by navigating the IPG and selecting broadcasts to later transfer to the storage device. The user may select one or more broadcasts, or may repeatedly transfer the same program in a series to the storage device. The user has the option to extend the time slot, in which a show is scheduled to be transferred to the storage device. The time slot may be extended before the show, after the show, or both. The system also implements an automatic extension of the time slot by default. Automatically extended time is used to ensure that the data is completely captured to the system, in case the broadcast time and the set-top box time are slightly out of sync or the broadcaster unexpectedly begins a show's broadcast slightly early or late.

Each show is given a priority either automatically or manually. Each user extended and automatically extended timeslot is also prioritized. When a conflict arises, the present invention generates solutions to the conflicts. When a conflict is merely multiple shows that overlap, various factors are used to determine which show is the highest priority. When a user extended or automatically extended time slot causes a conflict, then the extended time slots are prioritized separately from the actual show and the algorithms attempt to resolve conflicts by removing user extended or automatically extended time slots.

In one embodiment, where there are several solutions to a conflict, the system automatically finds the shows that, when removed from the transfer schedule, will result in the most shows of the highest priority to be transferred. Typically the system will present one or two of the most optimal shows to remove from the schedule to achieve a good solution. In another embodiment, an adjacent show list is implemented. The adjacent show list contains meta-data for the shows immediately before and after a scheduled show. The adjacent show list is used to disable user extended time for parental control reasons, so that an unauthorized user is not able to extend the transfer into the body of another show that they are not permitted to capture.

BRIEF DESCRIPTION OF THE DRAWINGS

The invention will be more fully understood by reference to the following drawings, which are for illustrative purposes only:

FIG. 2 is a diagram of a configuration for one of the multiple tuners associated with the video recorder.

FIG. 3 shows a configuration for a single decoder.

FIG. 4 is a diagram of a typical tuner arrangement for use with a live TV signal.

FIG. 5 is a diagram of a typical tuner arrangement for use when a storage device.

FIG. 6 shows an arrangement for when a user is watching a show mat has already been transferred to a storage device.

DETAILED DESCRIPTION OF THE INVENTION

The present invention is directed to a video recorder having user extended and automatically extended time slots. A video recorder as used herein refers to a device capable of transferring one or more broadcast signals to a storage device and retrieving the broadcast signals from the storage device. The terms video recorder, personal video recorder (PVR), and digital video recorder (DVR) are used herein interchangeably. Referring more specifically to the drawings, for illustrative purposes an embodiment of a video recorder is shown in the functional block diagram of FIG. 1.

Video Recorder

Figure 1:
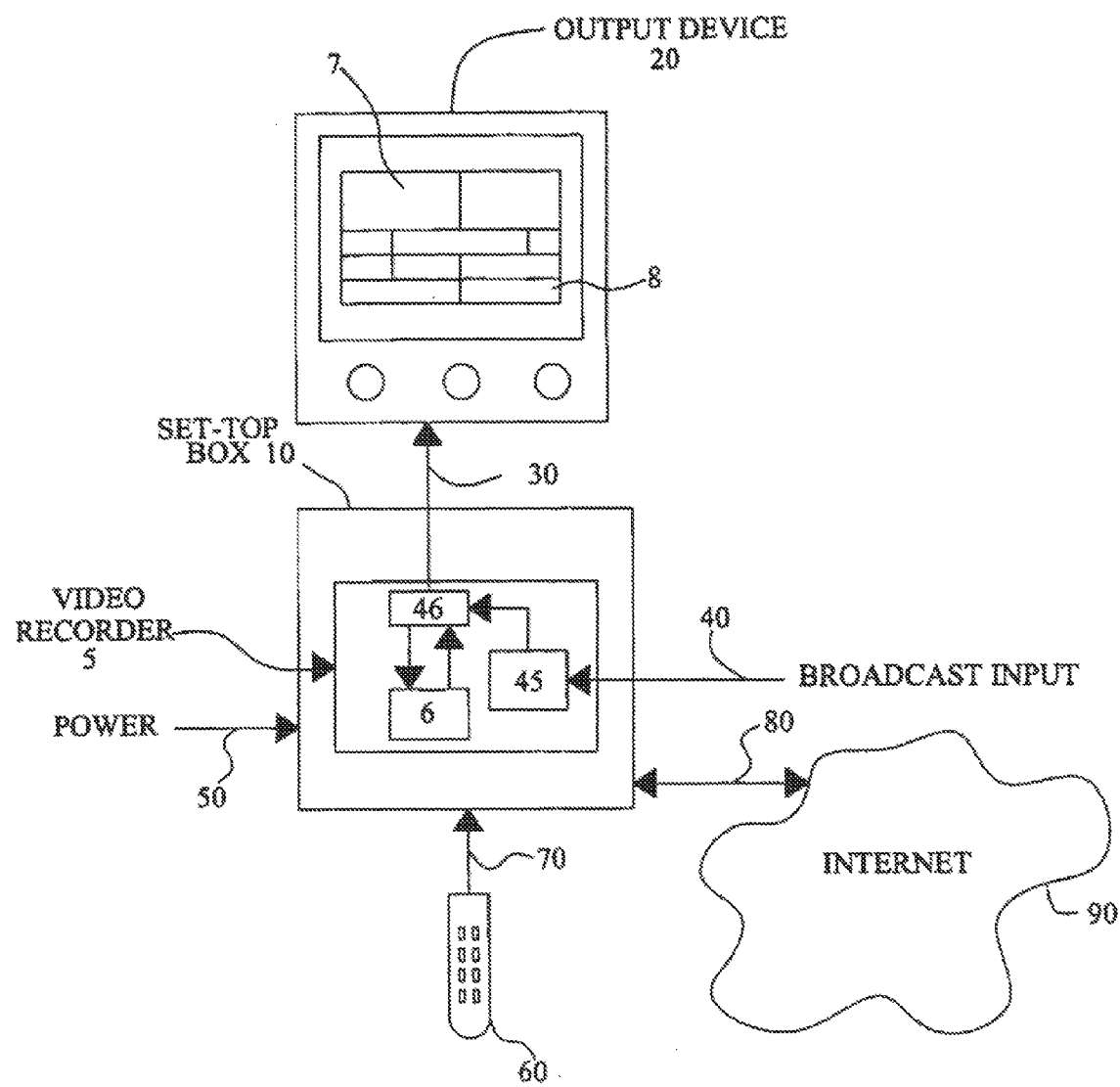
FIG. 1 is a functional block diagram of an embodiment of a set-top box.

A video recorder 5 is an internal or external component of a set-top box 10. The video recorder 5 includes some or all of a combination of software, hardware, and firmware. In one embodiment, the video recorder 5 uses a storage device 6, such as a hard drive that is internal or external to the set-top box 10 where shows are saved. The set-top box 10 connects to an output device 20, which facilitates the use of broadcast signals, such as live television signals, video on demand broadcasts, downloads of Internet content, viewing of web pages, and viewing of content previously transferred to the storage device 6. In the example of FIG. 1, set-top box 10 is shown as being external to output device 20. It should be understood by someone having ordinary skill in the art, that set-top box 10 maybe internal to output device 20 as well.

A GUI 7 that includes an IPG 8 is provided, which is displayed on the output device 20. GUI 7 in conjunction with IPG 8 allows the user to control the video recorder 5, typically using a remote control 60. For instance, the user may search the IPG 8 and select shows which are then scheduled to be transferred to storage device 6. The software or firmware that controls set-top box 10 may be installed locally or it may be downloaded from the Internet as needed when configuring new set-top boxes or when updating existing ones.

Set-top box 10 is connected to output device 20 via a transmission line 30. Broadcast signals are received by the set-top box 10 via broadcast input source 40, which maybe connected to either an antenna, cable television outlet, or other suitable input source. One or more tuner systems 45 are configured to allow the system to utilize broadcast signals from multiple channels. The video recorder component 5 includes a hard disk drive 6 in conjunction with a volatile memory 46, such as a Random Access Memory (RAM). Typically, the broadcast input along line 40 is handled by the tuner 45. The signal is temporarily resident in memory 46 using a circular buffer or other cache before being transferred more or less permanently to storage device 6. The tuner system 45 works in conjunction with the storage device 6 so that for each tuner in the system, each can simultaneously transfer broadcast signals to the storage device 6, or display Channels up to the given number of tuners on output device 20.

Set-top box 10 receives power through a line 50. Set-top box 10 receives user input entered from a handheld remote control 60 over a wireless link 70. Wireless link 70 may be ah infrared (IR) link, a radio frequency (RF) link, or any other suitable type of link. A bi-directional data path 80 is provided to set-top box 10, through which set-top box 10 can access the Internet 90. Transmission line 40 may provide data from a variety of input sources including cable, satellite, or electro-magnetic waves.

Tuner Management

In one embodiment of the present invention, the PVR uses multiple tuners. Each of the tuners is normally associated with one encoder and one cache, which may be a fixed or variable size cache (for a live signal) or a fixed file in the case where the incoming signal is merely transferred to the storage device. FIG. 2 shows various configurations for one of the multiple tuners associated with the PVR. Video stream 200 is provided to tuner 210, which passes the signal to encoder 220, which transfers the data in a cache 230. This configuration is used for analog use of a live TV signal.

An alternate configuration includes a video stream 240, which is then provided to tuner 245, which is then passed to encoder 250 and then to fixed file block 260. This configuration is useful for the analog transfer of a signal. For digital channels, encoder blocks 220 and 250 are removed, since the signal has already been digitized.

FIG. 3 shows a configuration for a single decoder. Cache 300 provides data to decoder 310, which outputs video signal 320. This arrangement is useful for watching live TV. Alternatively, fixed file block 330 provides data to decoder 340, which outputs a video signal 350. This embodiment is useful for playing back a show that has already been transferred to the storage device.

Each decoder shown in FIG. 3 is associated with a tuner/encoder pair. For a live TV signal, FIG. 4 shows an example of a typical arrangement, where video signal 400 is transmitted to tuner 410 then to encoder 420 and to cache 430. After it leaves cache 430 it is decoded in block 440 and the outgoing video signal 450 is displayed on the television. It should be noted that a delay interval 460 of a given (x) number of seconds occurs between the time the signal reaches encoder 420 and is output by decoder 440. Therefore, a live TV signal is typically a signal that has been delayed by (x) seconds. If a user is watching a program arid is currently transferring the program to a storage device as well, a cache, as shown in block 430 of FIG. 4 is not used. Instead, a fixed buffer 500, shown in FIG. 5 is used.

If the user is watching a show that has already been transferred to the storage device, the decoder is decoupled from the encoder (i.e., it reads from a different cache than the encoder), which continues to encode and cache the live video signal. This embodiment is shown in FIG. 6, where video signal 600 is tuned at block 605 and encoded at block 610 and stored in buffer 620. Fixed buffer 630 is used to provide data to decoder 640, which provides the output signal 650.

Figure 7:
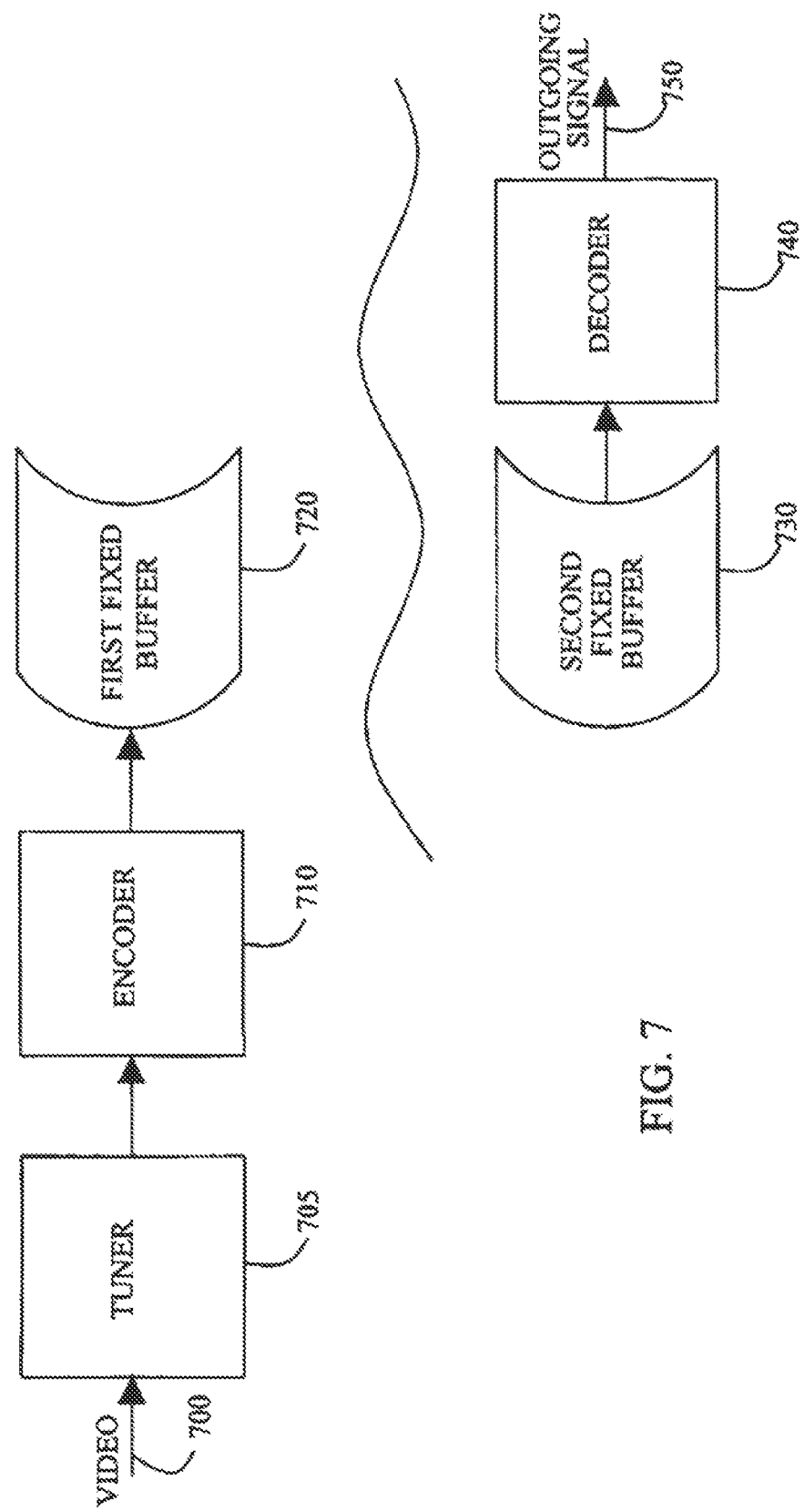
FIG. 7 shows an arrangement for when a user is watching a show on the storage device while another show is being transferred to the storage device.

Finally, if a user is watching a show that resides already on the storage device while another show is currently being transferred to the storage device, two different fixed buffers are implemented. This embodiment of the present invention is shown in FIG. 7. Video signal 700 is tuned at block 705 and encoded at block 710 and stored in a first fixed buffer 720. A second fixed buffer 730 is used to watch the previously saved show, by transmitting and decoding the data at block 740 and displaying the output video signal 750 on a television.

Show Scheduling

A user might schedule a show in a number of ways that could potentially give rise to a conflict. In one scenario the user is watching a television broadcast and presses a button on a remote control intended to initiate a transfer of the current show to the storage device. At the same time, another show is already being transferred to the storage device on another channel and the system cannot transfer both simultaneously. Alternatively, the user may have scheduled a number of shows to automatically be transferred to the storage device, for instance by accessing an IPG and selecting shows and/or by setting up the automatic transfer of certain series or specific programs (a series manager). If at some time that number of shows scheduled to be transferred exceeds the number of available tuners, a conflict arises.

Figure 8:
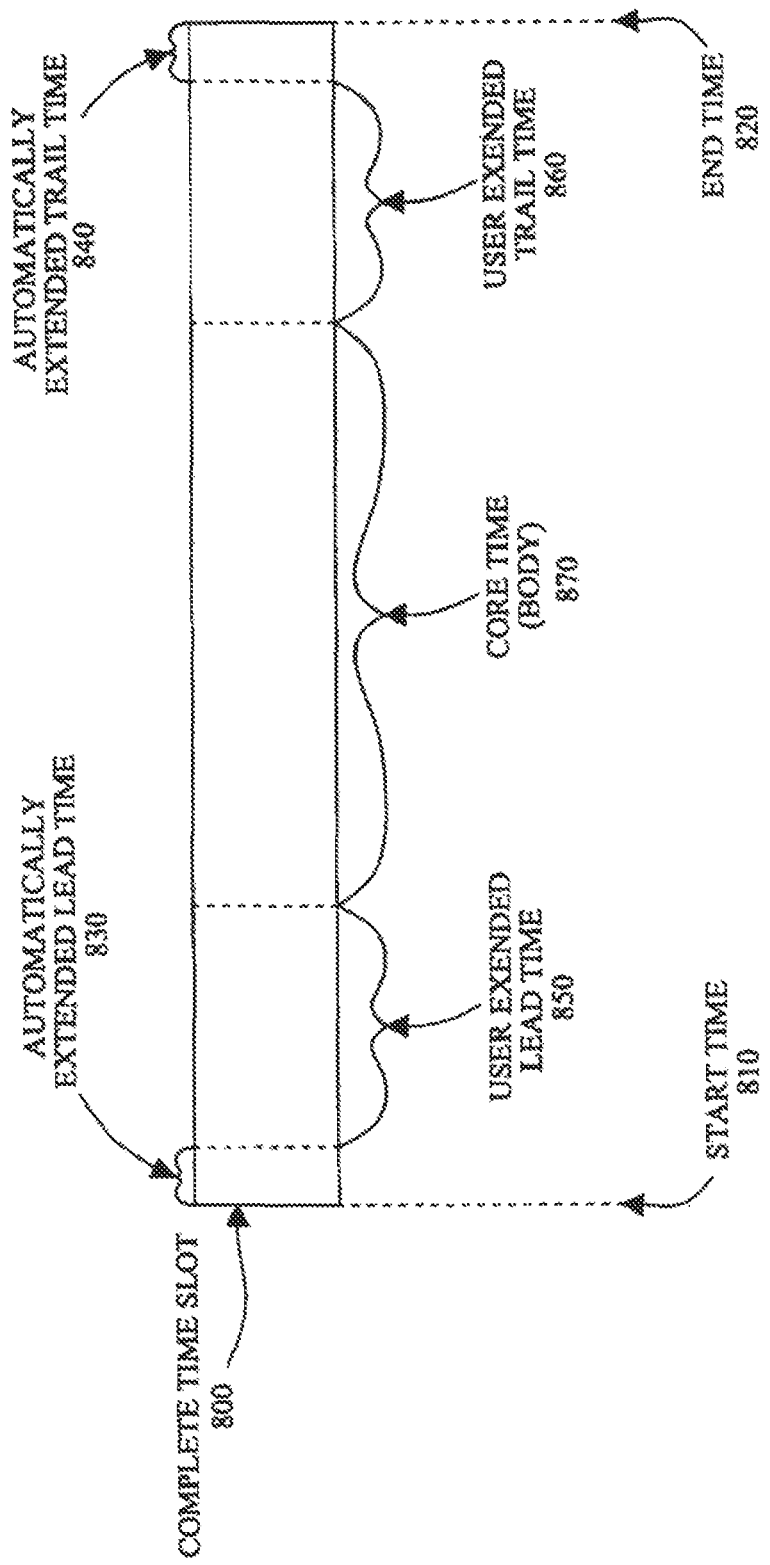
FIG. 8 is a block diagram showing the components of a scheduled show and its corresponding timeslots according to one embodiment of the invention.

Whenever a user schedules a show, the complete timeslot the system needs to have a tuner available to transfer the show is partitioned into its respective component timeslots. FIG. 8 gives an example of some of the components in a typical complete timeslot. Complete timeslot 800 has a start time 810 and an end time 820. Between start time 810 and end time 820 is the complete time slot. The timeslot 800 comprises automatically extended 830 and automatically extended trail time 840. Automatically extended times 830 and 840 are typically only for a few minutes and may be automatically added to every show scheduled by the user. User extended lead time 850 and user extended trail time 860 are timeslots the user has manually asked the system to append to the actual show that comprises the core time 870 also referred to as the body of the show. Each component of the partitioned timeslot 800 is given a different priority and each is handled as a separate entity when the system attempts to resolve a conflict.

Conflict Resolution

An embodiment of the present invention is configured to process conflicts. A conflict occurs when the number of shows (or component timeslots) scheduled to be transferred to the storage device exceed the number of available tuners. For the purposes of this example, it is assumed for simplicity that the system has two tuners, although the system may have any number of tuners. In one scenario the user is watching a television broadcast and presses a button on a remote control intended to initiate a transfer of the current show to the storage device. The pressing of the button generates an instruction to the video recorder which causes it to schedule the show. At the same time, another show is already being transferred to the storage device on another channel.

Alternatively, the user may have instructed the system to schedule a number of shows to automatically be transferred to the storage device, for instance by accessing an IPG and selecting shows and/or by setting up the automatic transfer of certain series or specific programs in the series manager. If at some time that number of shows scheduled to be transferred exceeds the number of available tuners, a conflict arises. Moreover, the user may have automatically extended timeslots enabled on their system. If so, the time slot either leading or trailing the show may extend into the body of another show. If this event causes the number of available tuners to be exceeded, then a conflict arises. Also, a user may have extended a show either at the lead or trail end and this manual extension may run into the body of another program and cause a similar conflict.

Figure 9:
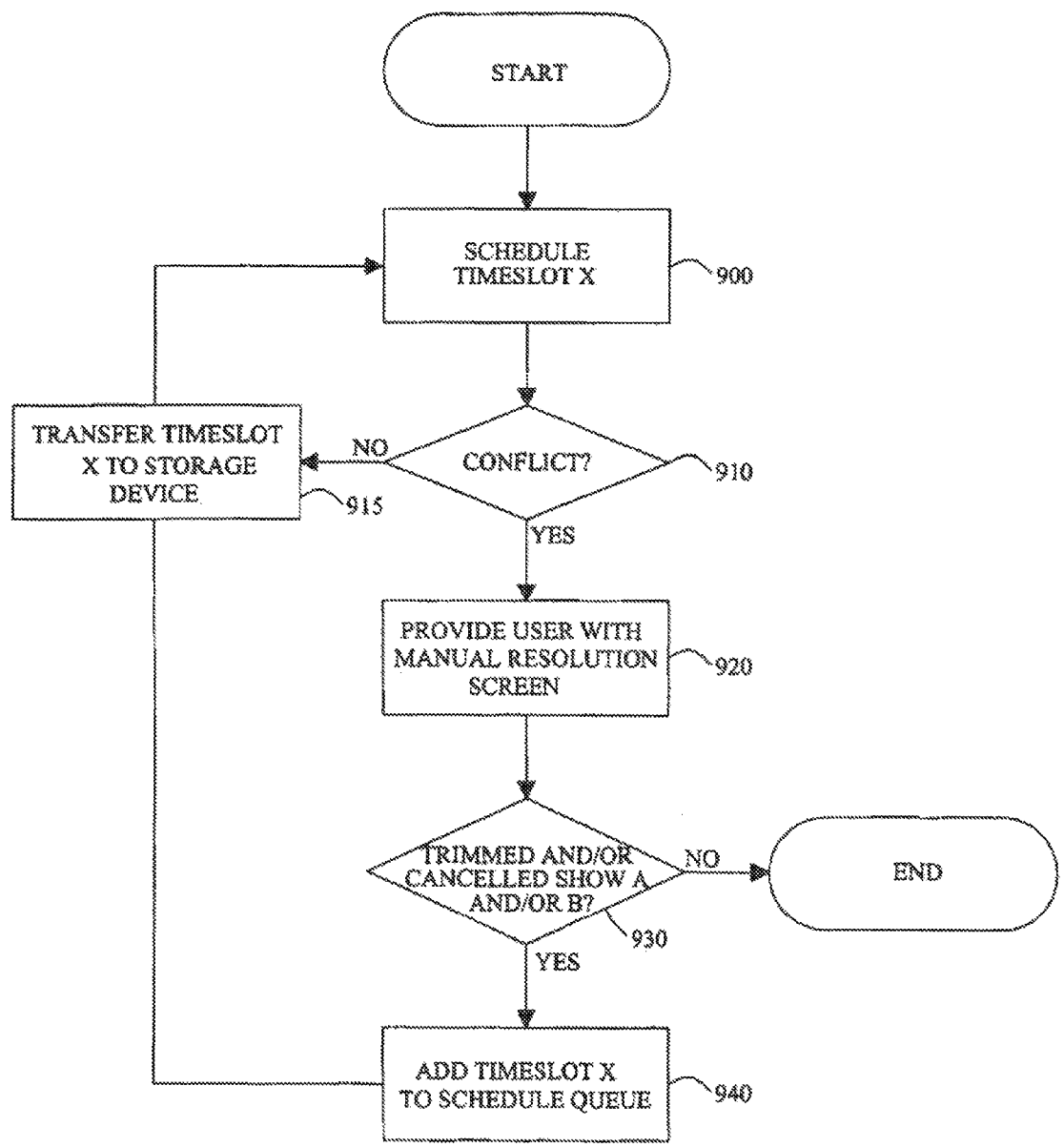
FIG. 9 is a flowchart showing how one embodiment of the present invention manually resolves conflicts.

When conflicts arise, the user will typically be given notice and an opportunity to correct (solve) the conflict manually before it occurs. However, if the user does not or is not available to interact with the system, then the system automatically solve the conflict. FIG. 9 is a flowchart giving an example of how one embodiment of the present invention identifies and finds solutions to conflicts manually.

At block 900 a user schedules shows (including user extended and automatically extended timeslots) that they want to transfer to the storage device, collectively this is called timeslot x. At block 910 it is determined if the number of available tuners during timeslot x is less than what is needed to completely transfer timeslot x and any other shows that are scheduled during that timeslot. (i.e., there is a conflict). If there is no conflict, the system transfers timeslot x at block 915 to the storage device, and block 900 repeats.

If there is a conflict then at block 920, the system provides the user with a manual resolution screen. An example of a manual resolution screen includes various choices to manually resolve the conflict. These include, for instance, cancel show A, cancel show B, do not schedule timeslot x, or trim shows A and/or B. Trimming the show includes, for instance, removing user extended or automatically extended timeslots. At block 930, it is determined if the user has solved the conflict manually by trimming or canceling shows A and/or B. If so, then timeslot x is added to the schedule queue at block 940 and flow proceeds to block 915. Otherwise, the user does not wish to schedule timeslot x, so the process is complete.

Figure 10:
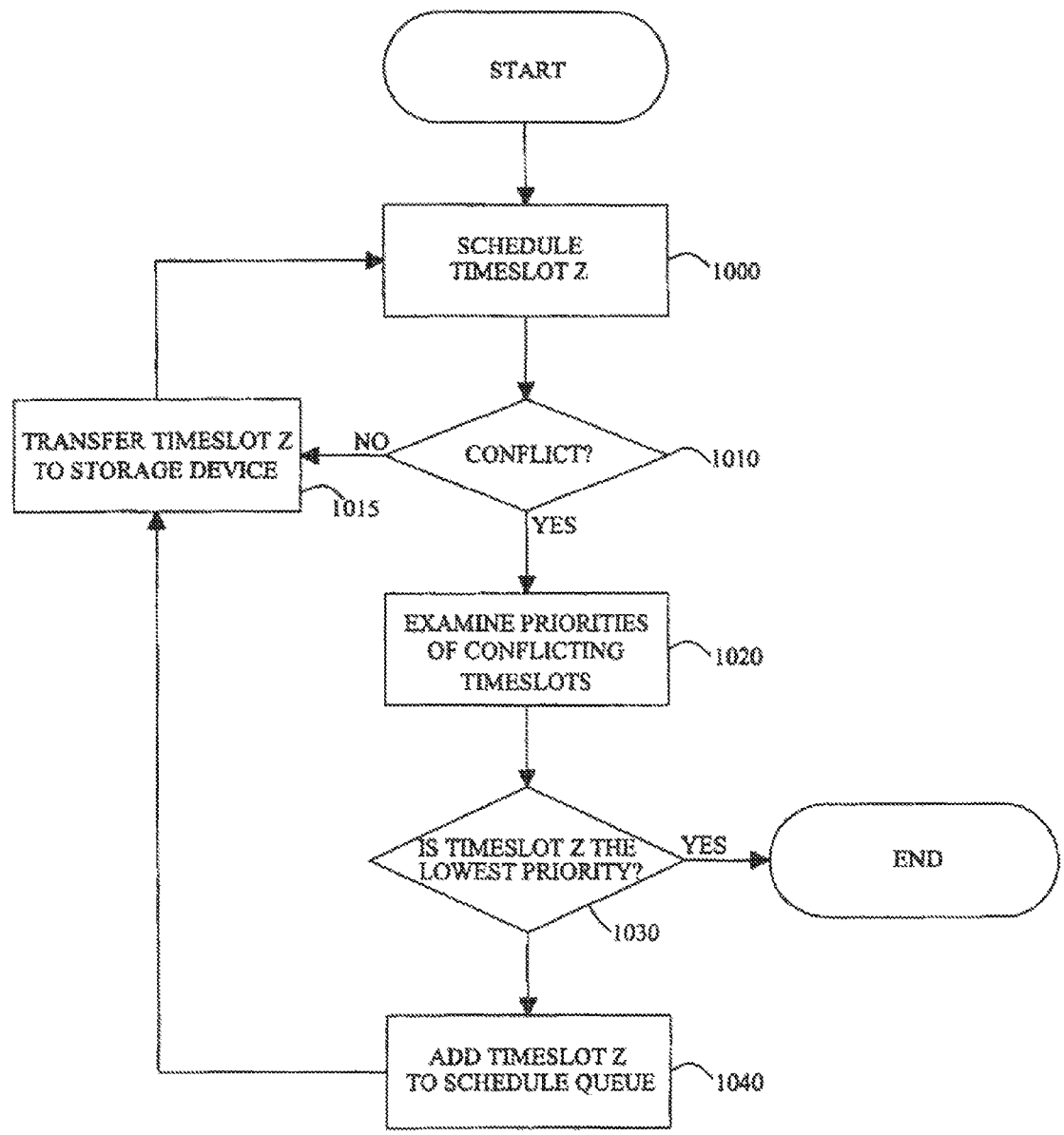
FIG. 10 is a flowchart showing how one embodiment of the present invention automatically resolves conflicts.

In another embodiment of the present invention, the conflicts are resolved automatically. This embodiment is shown in FIG. 10, where at block 1000 shows are automatically scheduled to be transferred to a storage device (including user extended and automatically extended timeslots), collectively this is called timeslot z. Timeslot z may be scheduled for instance, by an automated process (series manager) configured to transfer every instance of a certain show, type of sporting event, genre, title, timeslot, etc. At block 1010 it is determined if the number of available tuners during timeslot z is less than what is needed to completely transfer timeslot z and any other shows that are scheduled during that timeslot. (i.e., there is a conflict). If there is no conflict, the system transfers timeslot z at block 1015 to the storage device, and block 1000 repeats.

If there is a conflict then at block 1020, the system examines the priorities of the conflicting timeslots (including timeslot z). At block 1030, it is determined if timeslot z is the lowest priority timeslot. If so, then timeslot z is not scheduled and the process is complete. Otherwise, timeslot z is added to the schedule queue at block 1040 and block 1015 repeats.

Figure 11:
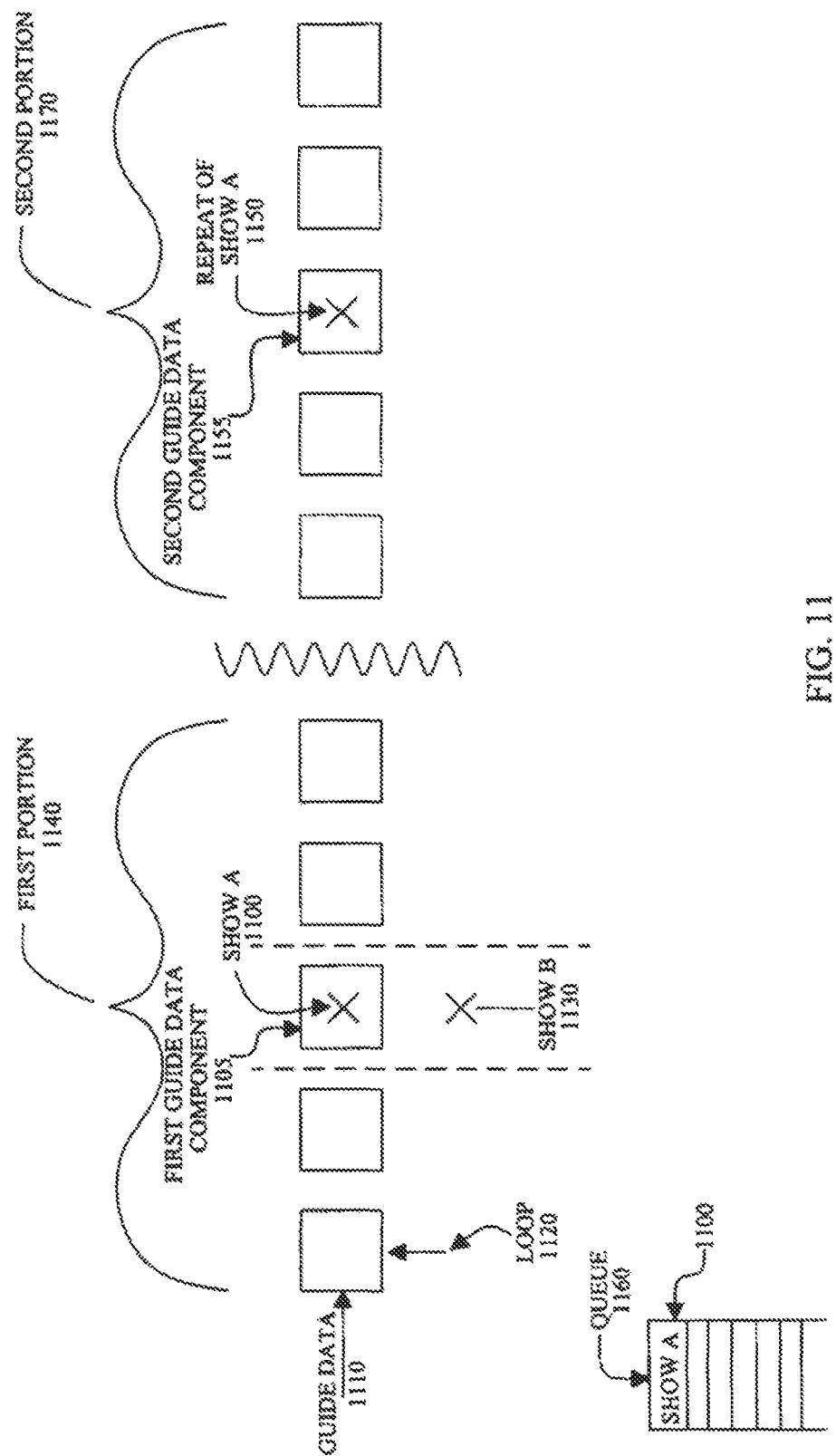
FIG. 11 is a block diagram showing a process whereby an embodiment of the present invention searches future guide data to transfer, in order to solve a conflict.

In another embodiment of the present invention, shows that are not transferred because of a conflict remain in a separate list or queue waiting to be transferred later if an opportunity occurs. For instance, the missed transfer may be broadcast again the next day. The system will attempt to initiate the transfer automatically the next day when the show occurs if it is possible. FIG. 11 shows how this process works according to one embodiment of the present invention.

Guide data 1110, which contains the information needed to determine what shows are broadcast at certain times, is transferred to the set-top in portions over time. For instance, one day of guide data may be downloaded at a time as first portion 1140. A loop 1120 walks through the guide data by comparing each component of the guide data to show A 1100, which has been entered in a queue 1160. It is assumed for the purposes of FIG. 11, that show B 1130 has previously scheduled arid that show B has a higher priority than show A 1100. In this example, show A 1100 is not transferred and show B 1130 is transferred when loop 1120 reaches first guide data component 1105 of guide data 1110.

As a second portion 1170 of guide data 1110 is downloaded, for instance the next day, the system continues walking through the guide data 1110 using loop 1120. Eventually, the system matches show A 1100 in queue 1160 with a repeated airing of show A 1150 when the loop 1120 reaches a second component of the guide data 1155. At this point the system is able to transfer repeated show A 1150 and the conflict is solved, since original show A 1100 is transferred and show B 1130 was also transferred. From a user perspective this is satisfactory, since they have stored both broadcasts and if the user did not immediately try to watch original show A, the whole process occurred transparently to the user.

In one embodiment, queue 1160 described in connection with FIG. 11 comprises multiple queues that are used together to resolve conflict. Table 1 shows some of the queues used to resolve conflicts:

TABLE 1

| Name of Queue | Purpose |
| --- | --- |
| Saved Show Queue | Saved shows are placed in the saved shows queue along with shows that are actively being transferred to the storage device |
| Schedule Queue | Shows that are scheduled to be transferred to the storage device in the future are placed in this queue |
| Series Manager Queue | Each entry in this queue comprises a template having data about each series that is automatically transferred to the storage device. This includes, for instance, the series' title, genre, time, etc. The data is used, for instance to find matches in guide data entries when a loop walks the guide data. |
| Manually Deleted Queue | This queue contains shows the user has manually deleted from a series manager or schedule queue. |
| Adjacent Shows Queue | Contains entries about shows adjacent (before and after) shows in the schedule queue. It is used to prevent the system from transferring a portion of a show (user or automatically extended timeslot) that might have adult content. |

Figure 12:
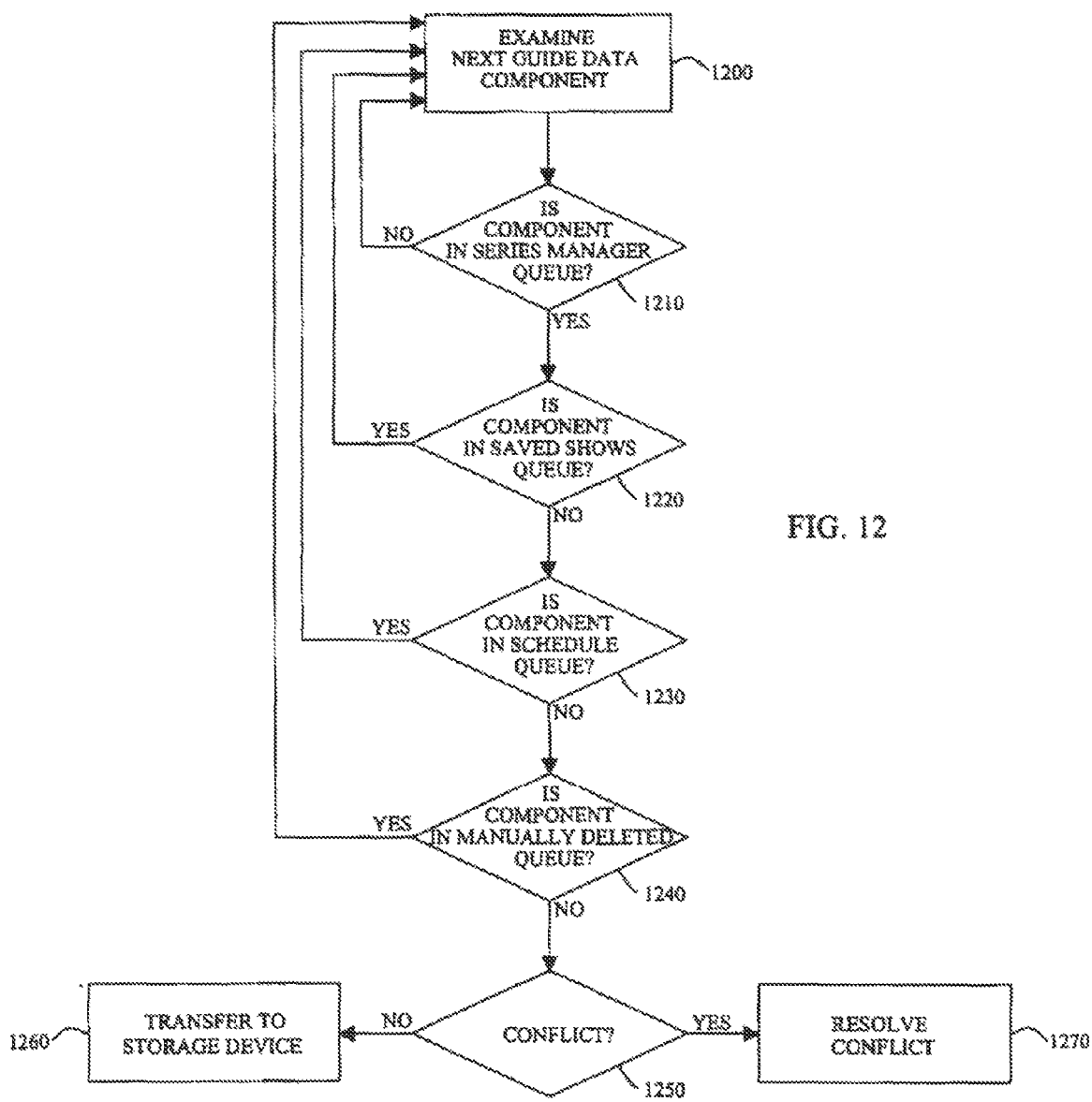
FIG. 12 is another flowchart showing how an embodiment of the present invention automatically resolves conflicts.

FIG. 12 is a flowchart showing how the queues described with respect to Table 1 are used when carrying put a process, such as the process described in FIG. 10. At block 1200 a component of the guide data representing a show is examined. At block 1210, it is determined if the component of the block of guide data matches a pattern of a show in the series manager queue (i.e., the user intends to record this show every time it occurs). If not, block 1200 repeats on the next available component of the guide data. If so, then at block 1220, it is determined if that component of the guide data already resides in the saved show queue If it does, then the show is not transferred, since it already has been saved, and block 1200 repeats. Otherwise, it is determined if the guide data component is already in the schedule queue at block 1230. If so, then it is not acted upon and block 1200 repeats. Otherwise, it is determined if the show is in the manually deleted queue at block 1240. If so, it is not acted upon since the user has decided manually not to transfer the show anymore, so block 1200 repeats. Otherwise, it is determined if there is a conflict at block 1250. If not, the show is transferred to the storage device at block 1260. Otherwise, the conflict is resolved at block 1270.

Manual Resolution Simplification Process

Figure 13:
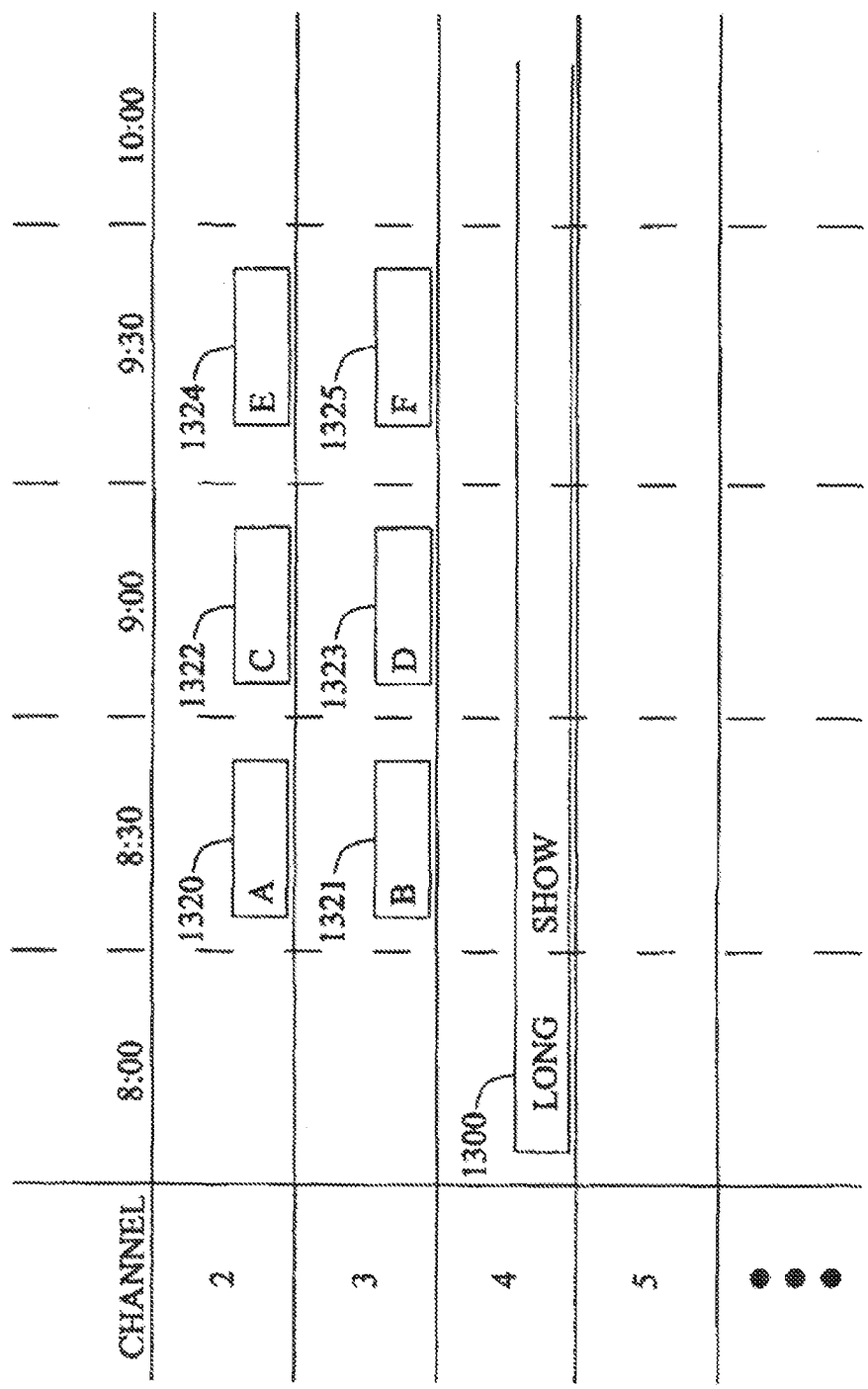
FIG. 13 is a block diagram showing how a conflict might arise that requires a manual resolution simplification process.

When a PVR, DVR, or other video recording system has many tuners, there may be an exponentially large number of potential solutions that will solve a conflict. To simplify the interface that is presented to the user to manually resolve the conflict, the present invention typically selects one or two choices to present to the user that are most satisfactory. FIG. 13 is a diagram showing how multiple solutions may occur.

Assume the user has scheduled a long show 1300 for transfer to the storage device. The long show may, for instance be a sporting event or a movie. Within complete timeslot reserved for long show 1300, short programs A 1320, B 1321, C 1322, D 1323, E 1324, and F 1325 are also scheduled. Assuming the system under consideration has two tuners, three conflicts have arisen. There are multiple solutions to this conflict. A first solution is to choose A 1320, C 1322, E 1324, and long show 1300. A second solution is to choose B 1321, C 1322, E 1324, and long show 1300. There are a total of eight solutions to the present conflict. Instead of presenting the user with all eight solutions, the system, according to one embodiment, presents the user with only one or two optimal choices that will resolve the conflict.

Figure 14:
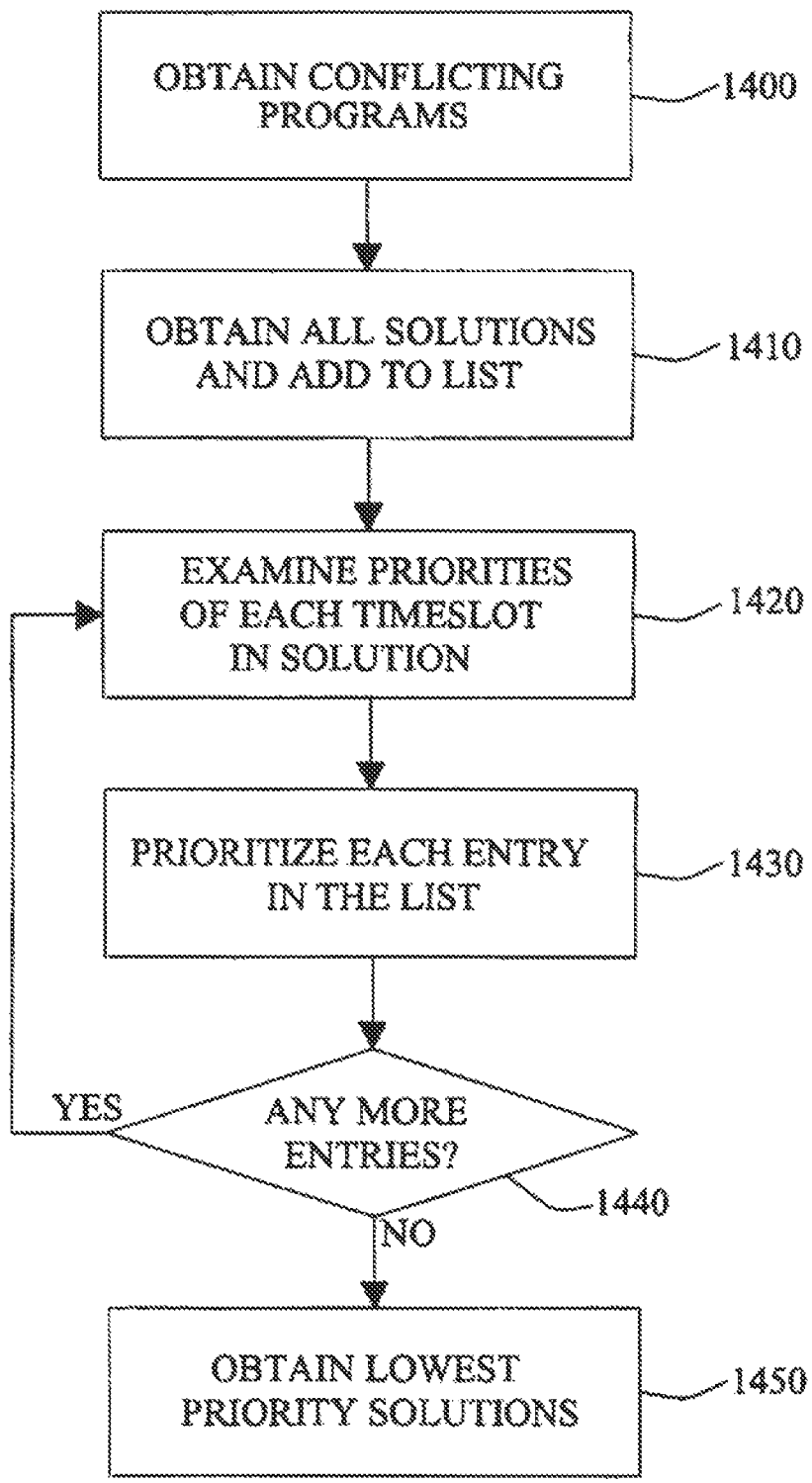
FIG. 14 is a flowchart showing a how an embodiment of the present invention produces the results of a manual resolution simplification process.

FIG. 14 is a flowchart describing the process of how an embodiment of the present invention finds and presents a user with a small amount of optimal choices to solve a conflict. The process begins at block 1400 where all conflicting programs/timeslots are obtained. At block 1410, all of the solutions are obtained and added to a list. At block 1420, each timeslot in the solution has its priority examined. At block 1430, a cumulative priority is given to the entry in the list based on the priorities of all of its timeslots involved in the solution. At block 1440, it is determined if there are any more entries for solutions in the list. If so, block 1420 repeats and the next solution entry in the list is prioritized. After the entire list is examined, the system presents the user at block 1450 with one or two of the lowest priority solutions, so that the user may delete one of those solutions to solve the conflict.

Show Priority

If there are instructions that cause a conflict for system resources, which prevent all the desired content from being transferred to the storage device, a prioritization system is used to determine which content is more desirable. This system is also used to determine undesirable content when deciding which shows to suggest to the user to delete in order to avoid conflicts as shown in FIG. 14. Each time slot to be saved, based user instructions, is handled as a type. A first type may be, for instance, automatically extended time, while a second type may be a show's body (or core time). Table 2 shows some examples of the various typing of timeslots and the resulting priority, according to an embodiment of the present invention:

TABLE 2

| Type 1 | Type 2 | Priority |
| --- | --- | --- |
| Currently being transferred to the storage device | Other content | Content 1 is given a higher priority. |
| Scheduled manually by the user to be transferred to the storage device | An episode automatically transferred to the storage device by a series manager | Content 1 is given a higher priority |
| Content automatically transferred to the storage device by a series manager | Content automatically transferred to the storage device by a series manager | The content with the highest series priority is chosen. The series priority may be set manually. One embodiment determines this by a position in a series queue. Shows closer to the top are more desirable |
| Equal priority as content 2 | Equal priority as content 1 | The longer content is given priority. |
| Automatically extended time | Not automatically extended time | The content that is not automatically extended time is given a higher priority |
| User extended lead time that extends into the body of content 2 | Other content | The body of content 2 is preserved and the user extended lead time is not recorded |
| User extended trail time that is less than a fixed interval and extends into the body of content 2 | Other content | The body of content 2 is preserved and the user extended trail time is not recorded. The fixed interval may be, for instance, 5 minutes. |
| User extended trail time that is greater than a fixed interval and extends into the body of content 2 | Other content | The extended trail time is recorded and the body of content 2 is truncated. |
| User extended trail time | User extended lead time | User extended trail time is given a higher priority. |

Figure 15:
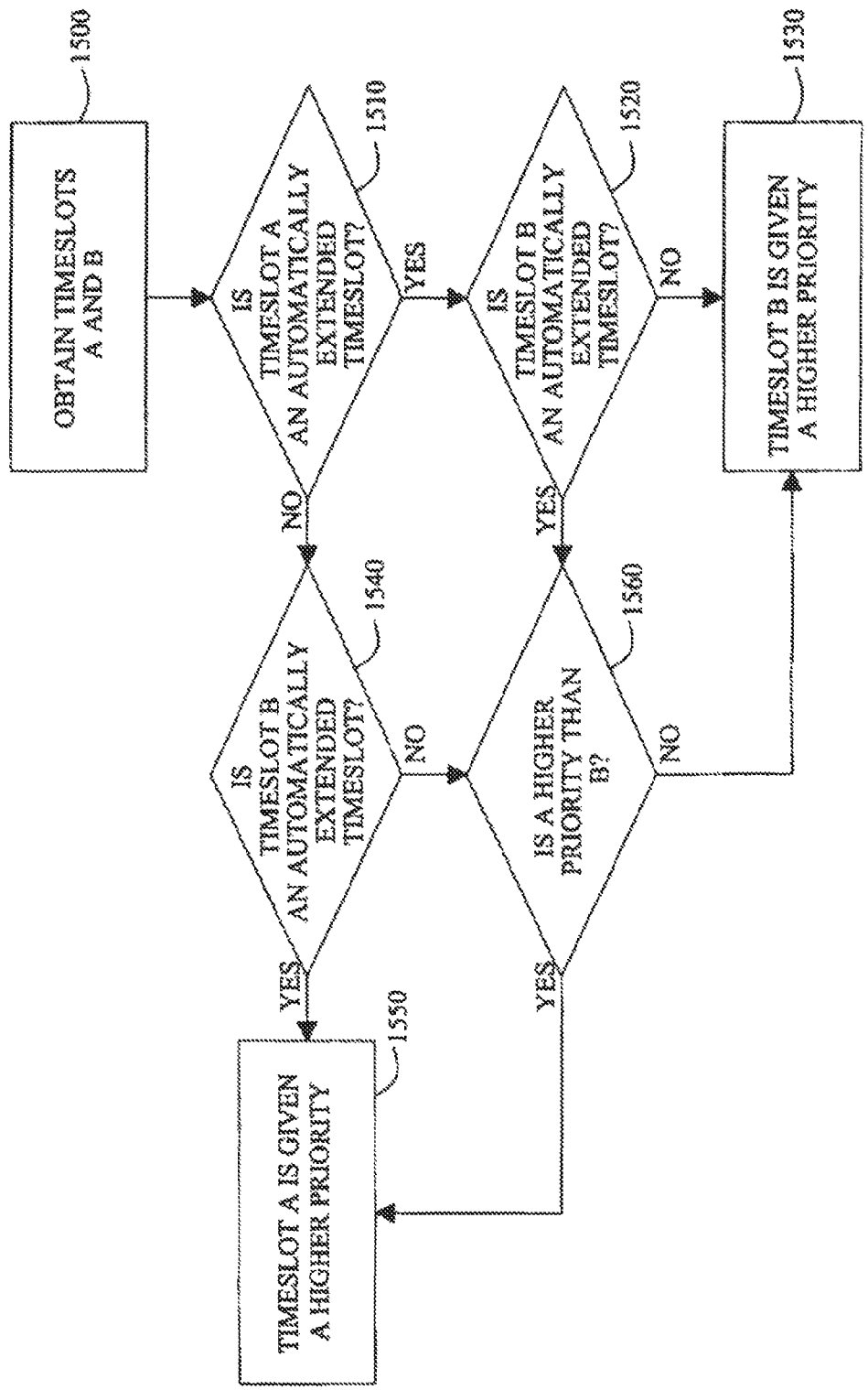
FIG. 15 is a flowchart showing the management of a conflict according to one embodiment of the invention.

When the system finds one or more conflicts and priority is needed to solve the conflict, the flowchart of FIG. 15 shows how one embodiment of the present invention resolves the conflict. The algorithm takes as input at block 1500 timeslots A and B, which are in conflict. Timeslots A and B are, for instance, the body of a show, user extended lead or trail time or automatically extended lead or trail time. At block 1510, it is determined if timeslot A is automatically extended time. If timeslot A is automatically, extended time, then it is determined at block 1520 if timeslot B is automatically extended time. If timeslot B is not automatically extended time, then timeslot B is given higher priority and the conflict is solved at block 1530.

If, however, at block 1510, timeslot A is not automatically extended time. Then it is determined at block 1540 if timeslot B is automatically extended time. If it is, then timeslot A is given a higher priority and the conflict is solved at block 1550. If, however, at block 1540, B is not automatically extended time or at block 1520, B is automatically extended time (meaning either both timeslots A and B are both automatically extended time or both are not automatically extended time) then at block 1560, it is determined if timeslot A is of a higher priority. If so then flow proceeds to block 1550. Otherwise, flow proceeds to block 1530.

Figure 16:
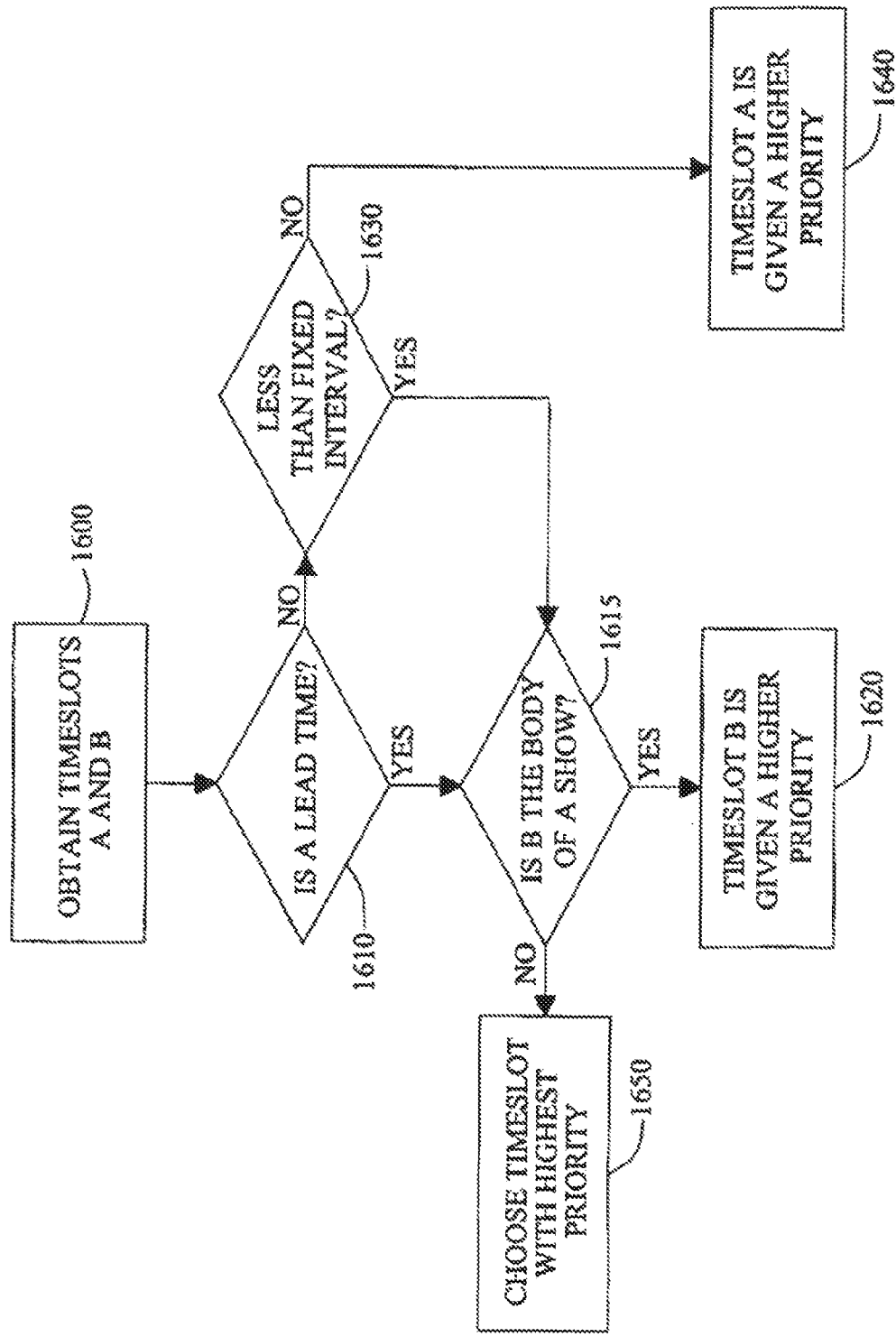
FIG. 16 is a flowchart showing the management of a conflict according to one embodiment of the invention.

If a conflict cannot be solved by using automatically extended time alone, then additional decision making algorithms are employed. These steps are invoked, for instance, when block 1560 of FIG. 15 is reached. FIG. 16 describes the steps that an embodiment of the present invention takes when it reaches a situation such as block 1560 of FIG. 15 when a conflict cannot be solved simply by not transferring the automatically extended time to the storage device. FIG. 16 assumes that timeslot A comprises user extended time.

At block 1600 the algorithm takes as input a user extended timeslot in timeslot A and other content, such as the body of a show or user extended time in timeslot B. At block 1610, it is determined if timeslot A is user extended lead time. If so, then at block 1615, it is determined if timeslot B is the body of a show. If so, then timeslot B is given priority at block 1620, and the user extended lead time is not transferred to the storage device.

If, however, at block 1610, timeslot A is user extended trail time, it is determined at block 1630, if the user extended trail time is less than a fixed interval, five minutes, for instance. If so, then it is determined at block 1615 if timeslot B is the body of a show. If so, then flow proceeds to block 1620 and timeslot B is transferred to the storage device if it is the body of a show. Otherwise, the trail time exceeds the fixed interval, so at block 1640, timeslot A is given priority and transferred to the storage device, while timeslot B is truncated. Returning to block 1615, if timeslot B is not the body of a show, then the timeslot with the highest priority is chosen at block 1650.

Adjacent Shows

In one embodiment of the present invention, a list is maintained of shows that are adjacent to a show that has been scheduled to be transferred to the storage device. This is useful, for instance, for parental control reasons. It is used to prevent an unauthorized user, such as a child, from misusing user extended lead time and user extended trail time to extend a transfer into the body of another show mat might have objectionable content. The adjacent show list contains meta-data for each show that is adjacent to a scheduled show.

Figure 17:
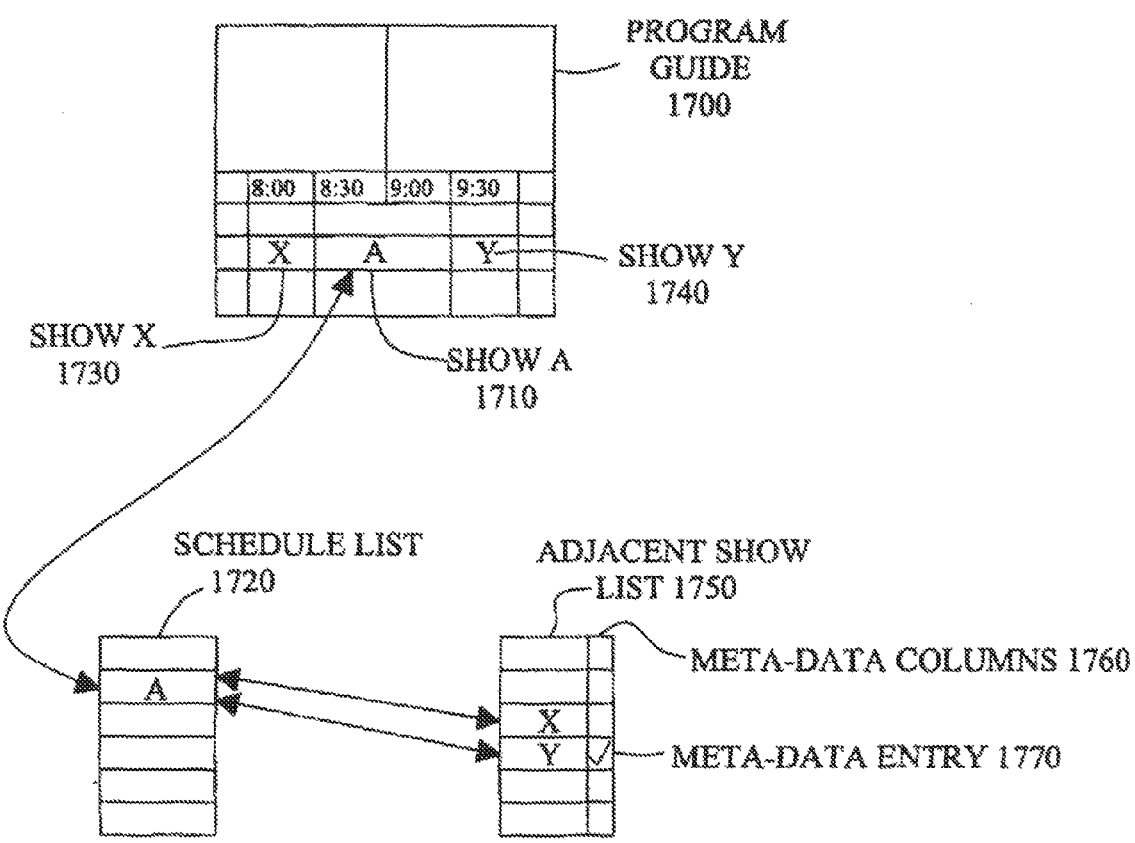
FIG. 17 is a block diagram showing the implementation of an adjacent show list according to one embodiment of the invention.

FIG. 17 is a block diagram showing the lists that are used by an embodiment of the present invention. Program guide 1700 contains all of the shows the user can currently schedule. Show A 1710 has been selected by the user. Show A 1710 is placed in schedule list 1720. Shows X 1730 and Y 1740 are adjacent to show A 1710. Adjacent shows X 1730 and Y 1740 are placed in adjacent show list 1750. One or more meta-data columns 1760 are associated with each entry. Currently a meta-data entry 1770 is activated in association with show Y 1740. This is one way in which a system is able to identify show Y 1740 as being one that needs parental control. For instance meta-data column entry 1770 might indicate that show Y 1740 is rated "R". Similarly, it might indicate that show Y 1740 is rated "X" or show Y 1740 has violent Content, graphic language, nudity, other objectionable rating information such as being on a specific channel, a content advisory, etc. Since show Y 1740 has a meta-data entry 1770 indicating that show Y 1740 violates a system content control, a user who has scheduled show A 1710 will hot be able to enable user extended trail time to extend into the body of show Y 1740, without the proper authentication, PIN, key, or the like.

Figure 18:
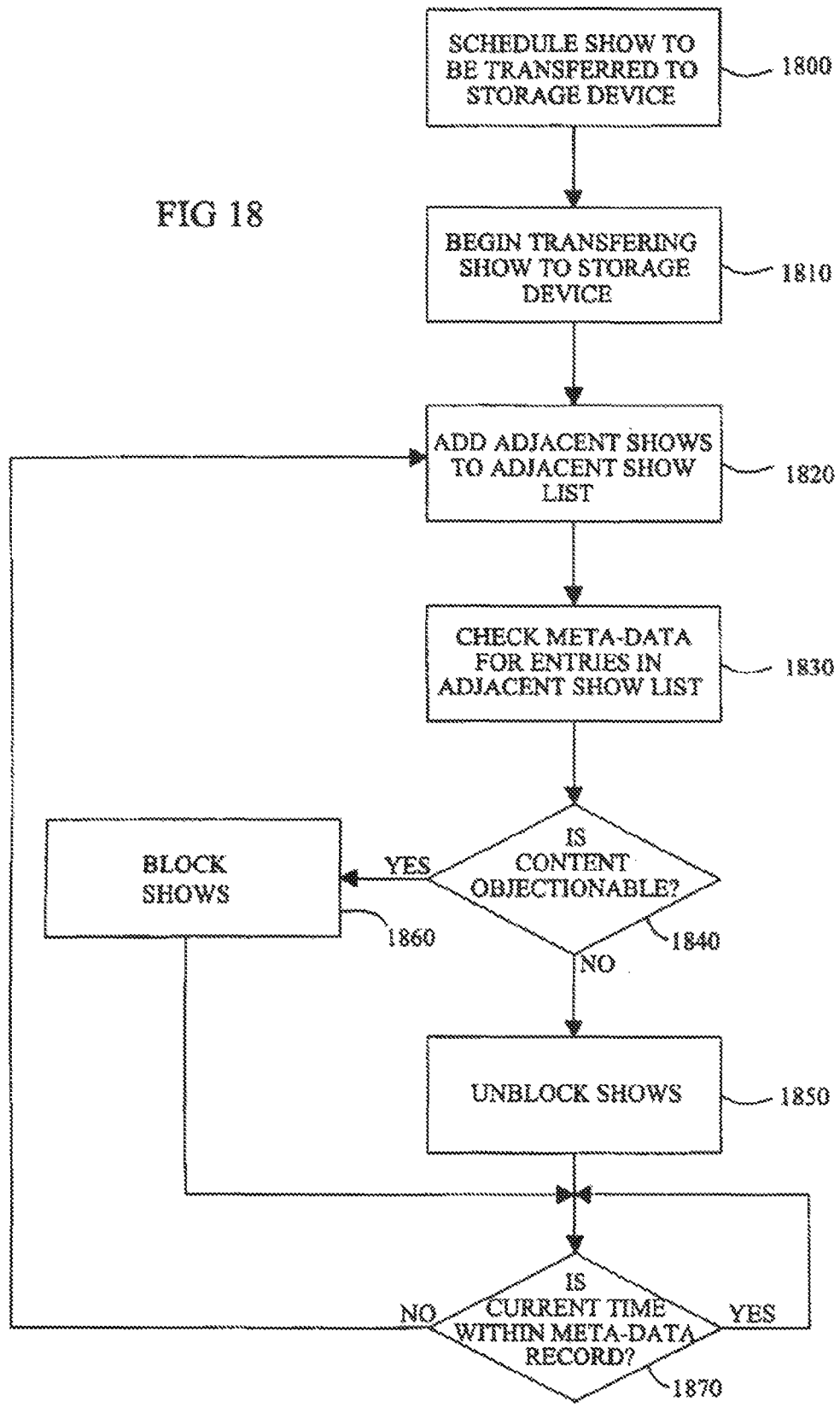
FIG. 18 is a flowchart showing how one embodiment of the invention handles an adjacent show list.

FIG. 18 is a flowchart showing the process of using an adjacent show list according to one embodiment of the present invention. At block 1800, a user schedules a show to be transferred to the storage device. At block 1810, the system begins transferring the show to the storage device. At block 1820, the shows adjacent to the show currently being transferred are placed in an adjacent show list. At block 1830, the meta-data for the shows in the adjacent show list is checked. At block 1840, it is determined if the meta-data indicates that either show in the adjacent show list contains content that might be restricted through parental controls. If so, the system blocks the show in the adjacent show list at block 1860. Otherwise, the system un-blocks the show at block 1850.

After blocks 1850 or 1860, it is determined if the current time is within the current-metadata record at block 1870. This is accomplished, for instance, by using a playback head that moves sequentially in time as the current show is transferred. As the playback head reaches the end of the current show and moves to the next show in time, the system will discover that the meta-data in the adjacent show list is no longer current. At that point the system updates the adjacent show list and block 1870 becomes false. When block 1870 becomes false, block 1820 repeats. Otherwise the system loops until block 1870 becomes false.

Overall System

Figure 19:
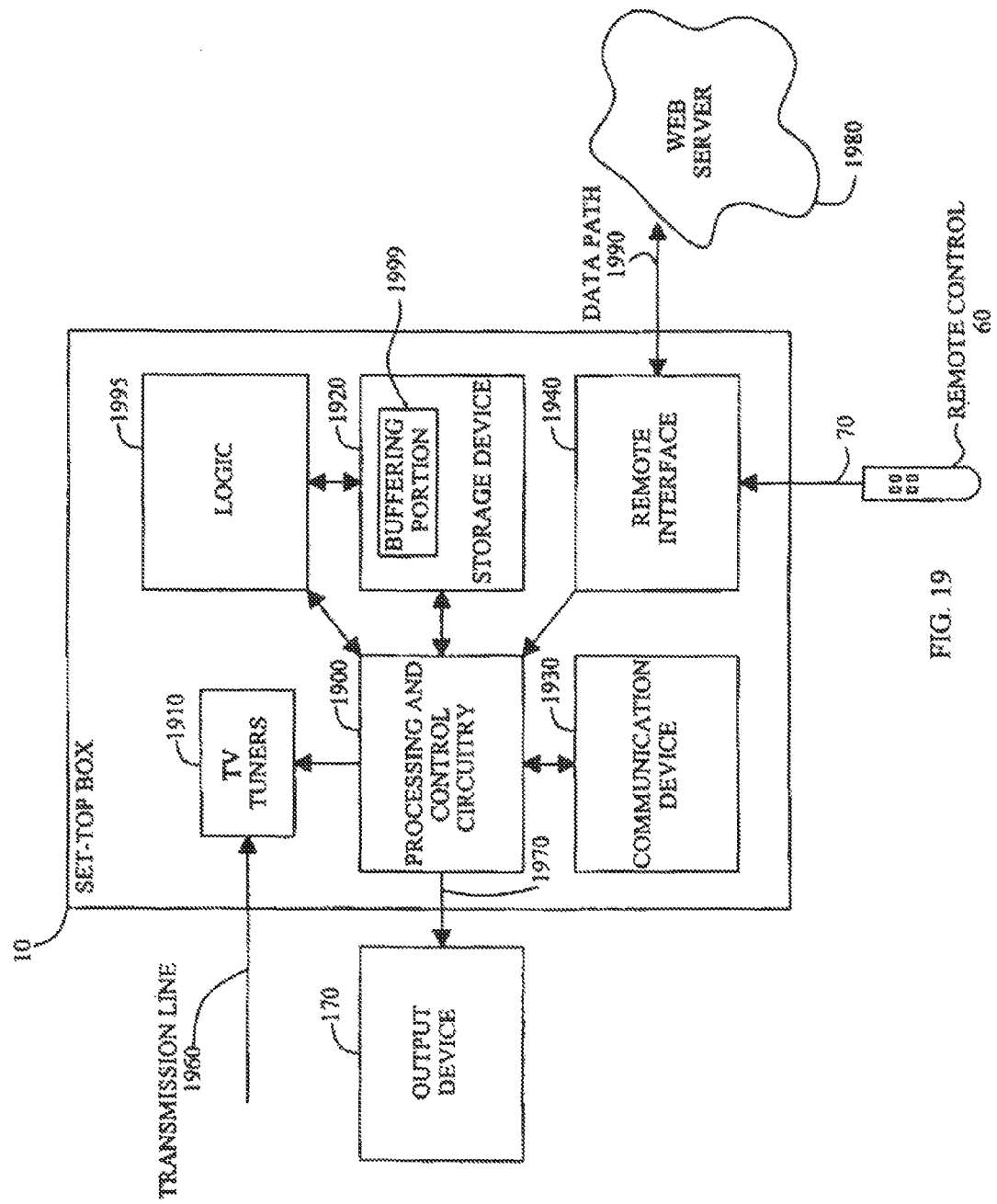
FIG. 19 is a functional block diagram of a video recorder according to an embodiment of the present invention.

FIG. 19 is a functional block diagram that illustrates the components of an embodiment of the present invention. Note that FIG. 19 is intended to be a conceptual diagram and does, not necessarily reflect the exact physical construction and interconnections of these components. Set-top box 10 includes processing and control circuitry 1900, which controls the overall operation of the system. Coupled to the processing and control circuitry 1900 are one or more TV tuners 1910, a storage device 1920, a communication device 1930, and a remote interface 1940.

Tuners 1910 receive broadcast signals on transmission line 1960, which may originate from an antenna, a cable television outlet, a satellite connection, or another suitable broadcast input source. Processing and control circuitry 1900 provides audio and video output to device 170 via a line 1970. Remote interface 1940 receives signals from remote control 60 via wireless connection 70. Communication device 1930 is used to transfer data between set-top box 10 and one or more remote processing systems, such as a web server 1980, via a data path 1990.

Processing and control circuitry 1900 may include one or more of devices such as general-purpose microprocessors, digital signal processors, application specific integrated circuits, various types of signal conditioning circuitry, including analog-to-digital converters, digital-to-analog converters, input/output buffers, etc. Storage device 1920 may include one or more physical memory devices, which may include volatile storage devices, non-volatile storage devices, or both. For example, storage device 1920 may include both random access memory (RAM), read-only memory (ROM), hard disk drives, various forms of programmable and/or erasable ROM, flash memory, or any combination of these devices.

Communication device 1930 may be a conventional telephone modem, an Integrated Services Digital Network adapter, a Digital Subscriber Line adapter, a cable television modem, or any other suitable data communication device. Logic 1995 typically is resident in storage device 1920. Logic 1995 controls the overall functionality of the system, including the GUI, IPG, and may also be used when the video recorder has been given conflicting instructions to transfer more shows to storage device 1920 then there are tuners 1910 available. For instance, an instruction might be generated from remote control 70 handled by the user. The instruction would be sent across line 70, through remote interface 1940, and to processing and control circuitry 1900 via logic 1995. Logic 1995 interprets arid determines the action needed to be taken based on the instruction and might eventually store information in storage device 1920 that would allow the system to act on the instruction at the appropriate time.

One or more of the algorithms and processes described herein to manually and/or automatically resolve conflicts are stored in logic portion 1995. These algorithms and other codes in logic portion 1995 are used, for instance, to recognize the existence of conflicts and to prioritize the conflicting programs to find solutions to the conflicts by using automatically extended time, user extended time, and core time, as well as other factors in assessing the priorities of conflicting timeslots.

User Extended Timeslot

A user extended timeslot is a timeslot that occurs before or after the core timeslot that covers the time period in which a show is being broadcast. If the user extended time slot is before the show it is called lead time and if it is after the show it is called trail time. When a user selects a show, either to record the show now or to schedule the show to be recorded later, the system determines whether the show is of a specific type. If the show is of a specific type, an additional dialog box is shown, wherein the additional dialog box allows the user to invoke a user extended trail time slot.

Specific types of shows include sports shows, for instance, or any other show where it is more common for the body of the show to extend beyond the scheduled timeslot in the program guide data. In such cases, it allows the user to include a user extended trail time slot without having to navigate the system and invoke the user extended trail time slot manually. In other cases, it allows a user that has no familiarity with the system to carry out their intent in a simplified way.

The specific type of show may be identified by the system in any number of ways. A first way is to examine the title field or description field in a database that relates to each show and to match keywords that are indicative of a sports show (or other type of show) in the title or description fields. A second way is to add a show type field to a database representing the program guide data and to invoke the user extended trail timeslot dialog box when elements in the show type field match the specific type that is of interest.

The dialog box includes an input field which, when selected, allows the user to always invoice a user extended trail timeslot for this type of show, so that the dialog box does not subsequently appear on the screen and the user extended trail timeslot is invoked automatically in the future. The user may also set the length of the user extended trail timeslot, (i.e., 30 minutes) to save disk space. Alternatively, a default time period may be used.

Figure 20:
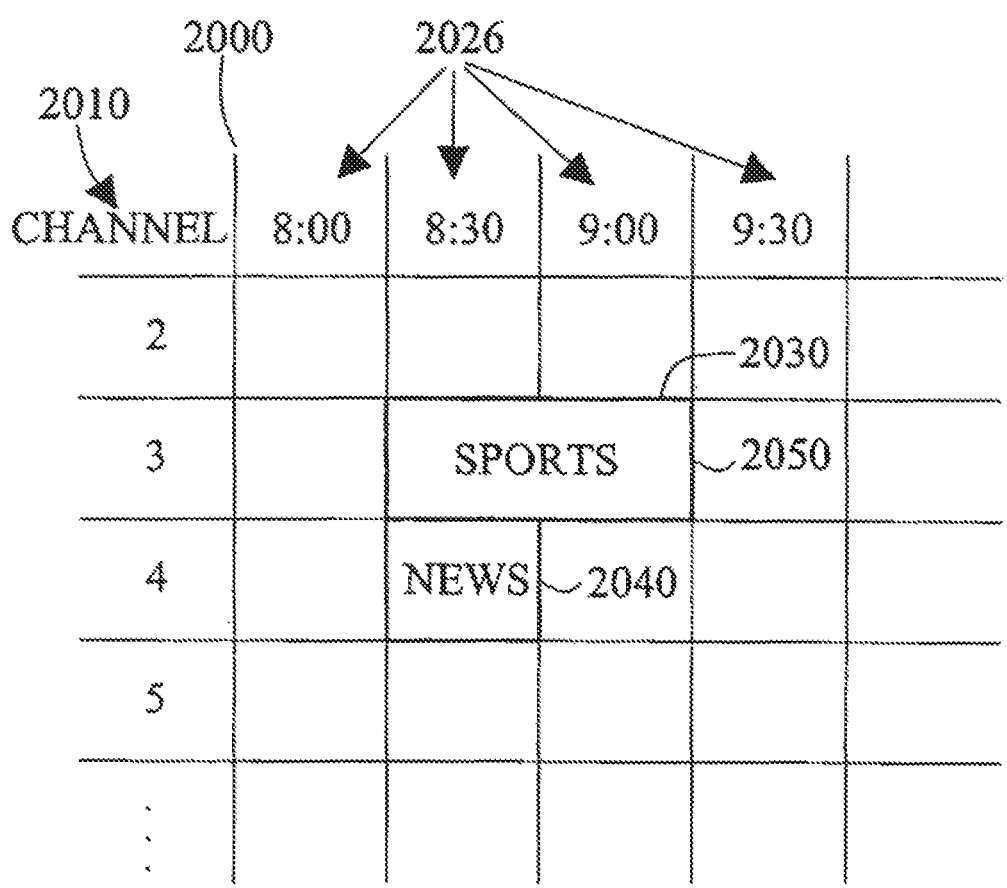
FIG. 20 is an example of a program guide screen used by an embodiment of the present invention.

FIG. 20 is an example of a program guide screen used by an embodiment of the present invention. Program guide 2000 includes a channel column 2010 and a plurality of time columns 2026. Each channel has a row that extends horizontally in time and includes information about the show that occurs on the channel during any given time period. This includes, for instance, the show's title, actors, description, type, time, rating, and any other pertinent information. In the present example, only show type is shown for simplicity. A first show 2030 is of type sports and a second show 2040 is of type news. When selected by the user, the first show 2030 may be of a type that invokes an automatic dialog box or automatically invokes a user extended trail timeslot, if such an action has been set as a default by the user. Second show 2040 may not invoke the dialog box. The user alternatively may set the dialog box to be invoked on certain types of shows or the system can do it automatically with pre-set defaults. For the purposes of this example, show 2030 has a trailing edge 2050 that might extend beyond 9:30, for instance if the sports show goes into overtime or is longer than expected. Such a show 2030 is identified by the system and the additional dialog box is presented to the user.

Figure 21:
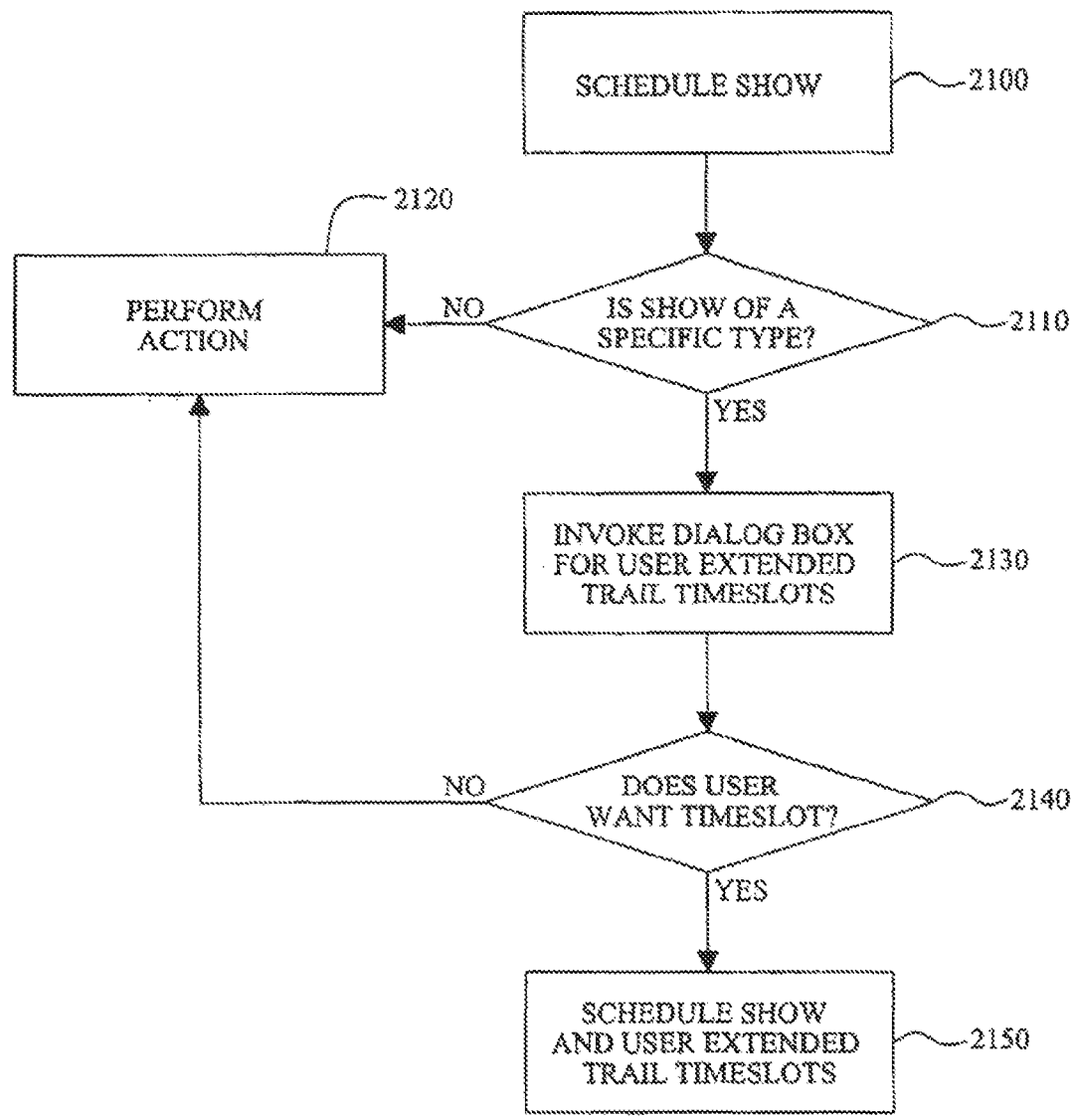
FIG. 21 is a flowchart showing the operation of a dialog box for a user extended trail timeslot according to an embodiment of the present invention.

FIG. 21 is a flowchart showing an embodiment of the present invention that uses a dialog box. At block 2100, the user schedules a show. This includes, for instance, the scheduling of a show to be recorded in the future, or the scheduling of a show to be recorded now. At block 2110, the system determines if the show is of a specific type. For instance, the show may be a sports show, as described in connection with FIG. 20, or it may be another type of show that is of particular interest to the user. If the show is not of the specific type, then at block 2120, the system performs the requested action (i.e., scheduling the show).

If the show is of a specific type at block 2110, then at block 2130 a dialog box is invoked that allows the user to add a user extended trail timeslot after the show is scheduled to end. At block 2140, it is determined if the user wants to add the timeslot. If not, the system performs the requested action at block 2120. Otherwise, the body of the show is scheduled along with the user extended trailing timeslot.

Figure 22:
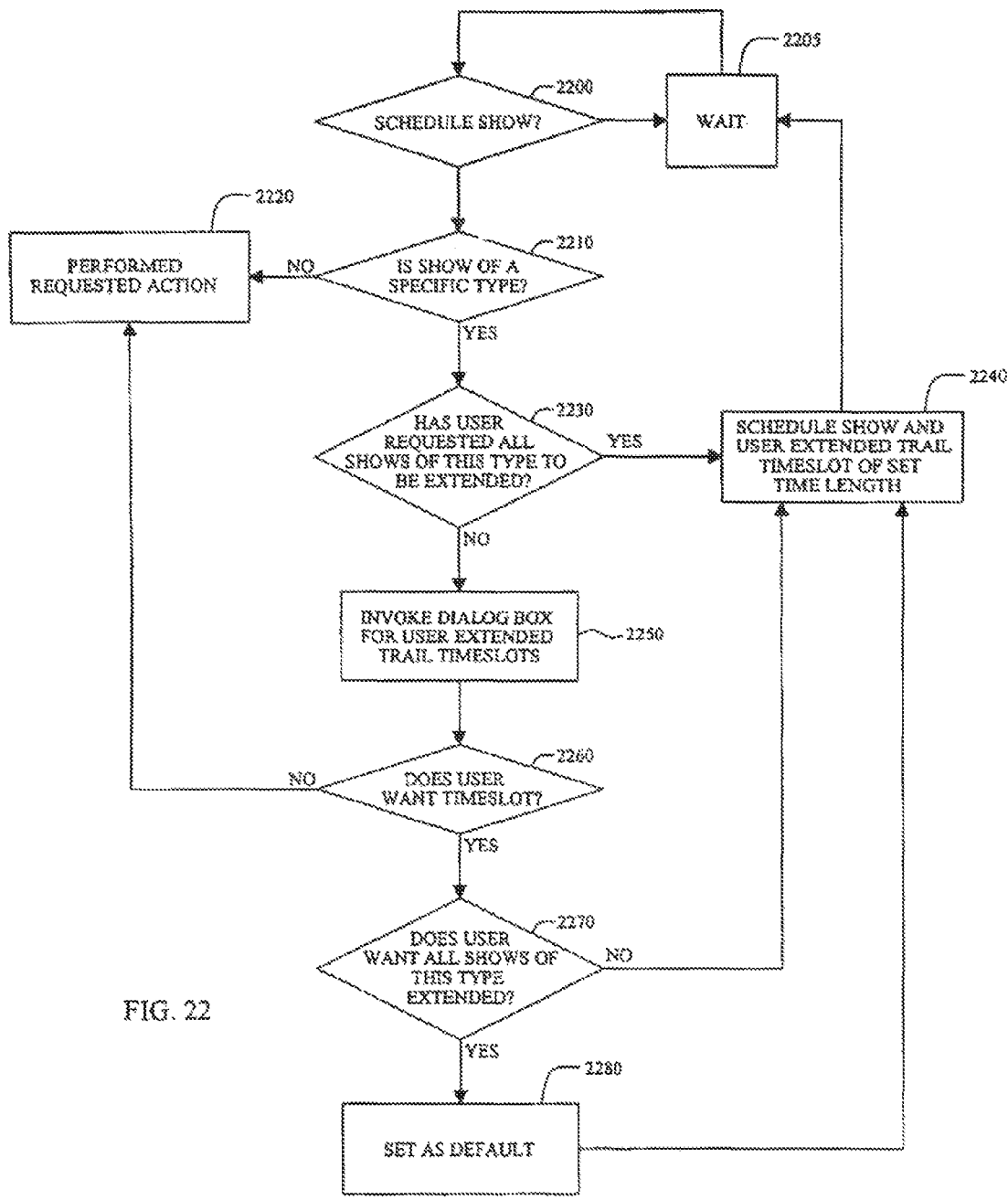
FIG. 22 is a flowchart showing the operation of a dialog box for a user extended trail timeslot according to another embodiment of the present invention.

FIG. 22 is a flowchart showing another embodiment of the present invention that uses a dialog box. At block 2200, it is determined whether the user has scheduled a show. This includes, for instance, the scheduling of a show to be recorded in the future, or the scheduling of a show to be recorded now. If the user has hot scheduled a show the system waits at block 2205 and repeats until the user does schedule a show. When the user does schedule a show, the system determines if the show is of a specific type at block 2210. For instance, the show may be a sports show, as described in connection with FIG. 20, or it may be another type of show that is of particular interest to the user. If the show is not of the specific type, then at block 2220, the system performs the requested action (i.e., scheduling the show).

If the show is of a specific type at block 2210, then at block 2230 it is determined whether the user has previously requested that all shows of this type have a user extended trailing timeslot automatically added. If so, then at block 2240 the show is scheduled along with a user extended trailing timeslot of the length that the user has designated. If not, a dialog box is invoked that allows the user to add a user extended trail timeslot after the show is scheduled to end at block 2250. At block 2260, it is determined if the user wants to add the timeslot. if not, the system performs the requested action at block 2220.

Otherwise, it is determined if the user wants all shows of this type to be extended automatically in the future at block 2270. If so, the action is set as the default at block 2280 so that in the future when the system reaches decision block 2230, it will be true, thereby eliminating the need to invoke the dialog box. In either case, after blocks 2270 or 2280, the system proceeds to block 2240 where the show is scheduled along with a user extended trailing timeslot of the length that the user has designated, and the process repeats at block 2200.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A method for storing media on a storage device, the method comprising:

scheduling, with control circuitry, a media asset to be stored in the storage device during a scheduled transmission time associated with the media asset, wherein the media asset has a given duration; and prior to any portion of the media asset being received:

determining whether the media asset, scheduled to be stored, is of a genre that commonly extends beyond its scheduled transmission time, causing the given duration of the media asset to increase, based on a comparison of a word associated with the media asset with one or more data fields stored in a database, wherein the one or more data fields stored in the database correspond to media content of the genre that commonly extends beyond its scheduled transmission time; and alerting a user of the control circuitry of an opportunity to extend storage of the media asset beyond the associated scheduled transmission time based on the determination that the media asset is of the genre that commonly extends beyond its scheduled transmission time.

2. The method of claim 1, further comprising alerting a user of potential conflicts due to extending storage of the media asset beyond the associated scheduled transmission time.

3. The method of claim 1, further comprising receiving a user indication to extend storage of the media asset beyond the associated scheduled transmission time.

4. The method of claim 3, wherein said step of receiving a user indication further comprises, automatically extending storage of the media asset by a predetermined amount.

5. The method of claim 4, wherein the predetermined amount is a timeslot interval.

6. The method of claim 4, wherein the predetermined amount is based on the genre of the media asset.

7. The method of claim 4, wherein automatically extending storage of the media asset by a predetermined amount includes prioritizing potential conflicts.

8. The method of claim 4, wherein automatically extending storage of the media asset by a predetermined amount includes automatically extending storage of all media content of that genre.

9. The method of claim 1, wherein the word associated with the media asset is a word in at least one of a title and a description associated with the media asset.

10. The method of claim 1, wherein the word associated with the media asset is identified from a description of the media asset, and wherein the determining comprises:

comparing the word with one or more keywords stored in the one or more data fields; and determining the media asset is of a genre that commonly extends beyond its scheduled transmission time in response to determining that the word matches a keyword associated with the genre.

11. A system for storing media, the system comprising:
a storage device configured to receive a media asset; and
control circuitry configured to:

schedule a media asset to be stored in the storage device during a scheduled transmission time associated with the media asset, wherein the media asset has a given duration; and prior to any portion of the media asset being received:

determine whether the media asset, scheduled to be stored, is of a genre that commonly extends beyond its scheduled transmission time, causing the given duration of the media asset to increase, based on a comparison of a word associated with the media asset with one or more data fields stored in a database, wherein the one or more data fields stored in the database correspond to media content of the genre that commonly extends beyond its scheduled transmission time; and alert a user of the control circuitry of an opportunity to extend storage of the media asset beyond the associated scheduled transmission time based on the determination that the media asset is of the genre that commonly extends beyond its scheduled transmission time.

12. The system of claim 11, wherein the control circuitry is further configured to alert a user of potential conflicts due to extending storage of the media asset beyond the associated scheduled transmission time.

13. The system of claim 11, wherein the control circuitry is further configured to receive a user indication to extend storage of the media asset beyond the associated scheduled transmission time.

14. The system of claim 13, wherein the control circuitry automatically extends storage of the media asset by a predetermined amount after receiving the user indication to extend storage of the media asset beyond the associated scheduled transmission time.

15. The system of claim 14, wherein the predetermined amount is a timeslot interval.

16. The system of claim 14, wherein the predetermined amount is based on the genre of the media asset.

17. The system of claim 14, wherein the control circuitry automatically extends storage of the media asset by a predetermined amount by prioritizing potential conflicts.

18. The system of claim 14, wherein the control circuitry automatically extends storage of the media asset by a predetermined amount by automatically extending storage of all media content of that genre.

19. The system of claim 11, wherein the word associated with the media asset is a word in at least one of a title and a description associated with the media asset.

20. The system of claim 11, wherein the word associated with the media asset is identified from a description of the media asset, and wherein the control circuitry is configured to determine whether the media asset is of the genre by being configured to:

compare the word with one or more keywords stored in the one or more data fields; and determine the media asset is of a genre that commonly extends beyond its scheduled transmission time in response to determining that the word matches a keyword associated with the genre.

* * * * *